United States Patent
Lee et al.

(10) Patent No.: US 9,923,613 B2
(45) Date of Patent: Mar. 20, 2018

(54) REFERENCE SIGNALS EXTENSION FOR MASSIVE MIMO SYSTEM

(71) Applicant: LG ELECTRONICS INC., Seoul (KR)

(72) Inventors: Kilbom Lee, Seoul (KR); Jiwon Kang, Seoul (KR); Hyunsoo Ko, Seoul (KR); Jaehoon Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 14/891,921

(22) PCT Filed: Feb. 21, 2014

(86) PCT No.: PCT/KR2014/001427
§ 371 (c)(1),
(2) Date: Nov. 17, 2015

(87) PCT Pub. No.: WO2014/193070
PCT Pub. Date: Dec. 4, 2014

(65) Prior Publication Data
US 2016/0112099 A1    Apr. 21, 2016

Related U.S. Application Data

(60) Provisional application No. 61/829,198, filed on May 30, 2013.

(51) Int. Cl.
*H04L 5/00* (2006.01)
*H04B 7/0413* (2017.01)
*H04L 25/02* (2006.01)

(52) U.S. Cl.
CPC ......... *H04B 7/0413* (2013.01); *H04L 5/0048* (2013.01); *H04L 25/0202* (2013.01)

(58) Field of Classification Search
CPC ... H04B 7/0413; H04L 5/0048; H04L 5/0053; H04L 5/0023; H04L 5/001; H04L 25/0202; H04W 72/042
See application file for complete search history.

(56) References Cited

U.S. PATENT DOCUMENTS

| | | | |
|---|---|---|---|
| 2011/0222489 A1 | 9/2011 | Awad | |
| 2011/0243023 A1* | 10/2011 | Taoka | H04L 5/0023 370/252 |
| 2011/0286423 A1* | 11/2011 | Berggren | H04L 5/001 370/329 |

(Continued)

FOREIGN PATENT DOCUMENTS

EP    2582193 A1    4/2013

OTHER PUBLICATIONS

Discussion on scenarios of 3D beamforming and Massive MIMO, ZTE, 3GPP TSG RAN WG1 Meeting #72, 7.3.6.1, St Julian's, Malta, Jan. 28-Feb. 1, 2013.

*Primary Examiner* — Jamal Javaid
(74) *Attorney, Agent, or Firm* — Dentons US LLP

(57) ABSTRACT

Reference signals (RSs) transmission scheme for massive MIMO system is disclosed. For this, 'M' resource blocks (RBs) are grouped into a resource block group (M>1). One or more antenna ports are grouped into one antenna group, wherein each of the antenna ports corresponds to each of the multiple antennas. The reference signals of the one antenna group are mapped into only one RB within one resource block group.

12 Claims, 24 Drawing Sheets

(56) References Cited

U.S. PATENT DOCUMENTS

| | | |
|---|---|---|
| 2013/0039203 A1 | 2/2013 | Fong et al. |
| 2013/0044727 A1 | 2/2013 | Nory et al. |
| 2013/0077560 A1* | 3/2013 | Horiuchi ............ H04W 72/044 370/315 |
| 2013/0116011 A1* | 5/2013 | Lee ...................... H04W 16/28 455/562.1 |

* cited by examiner

FIG. 2
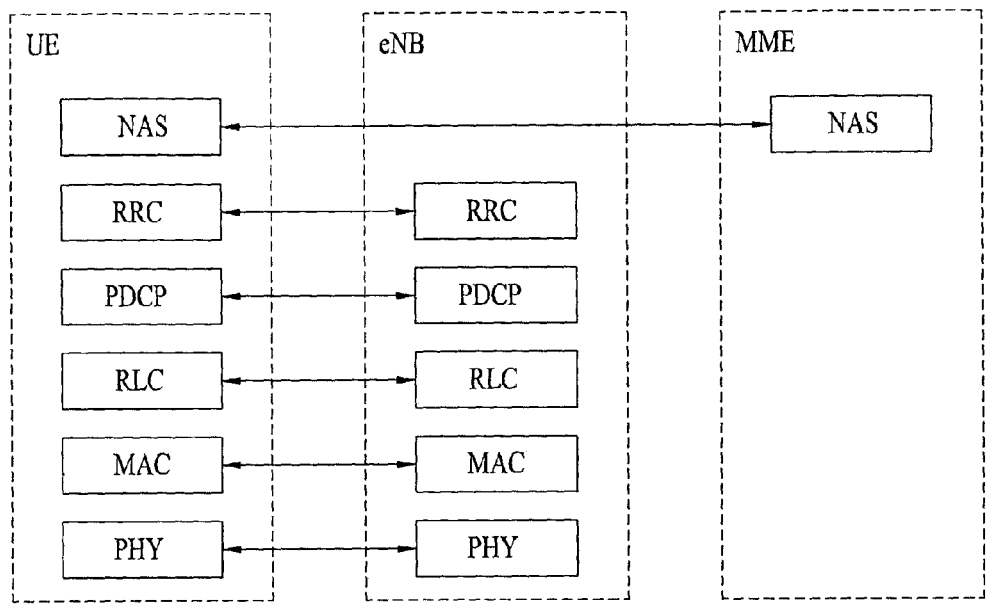
(a) Control-plane protocol stack
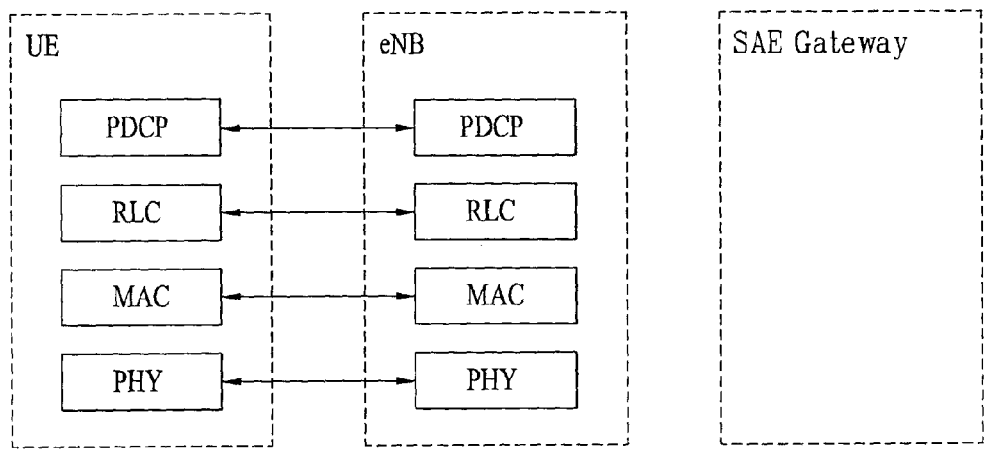
(b) User-plane protocol stack (a) Existing antenna system          (b) Active antenna system FIG. 11
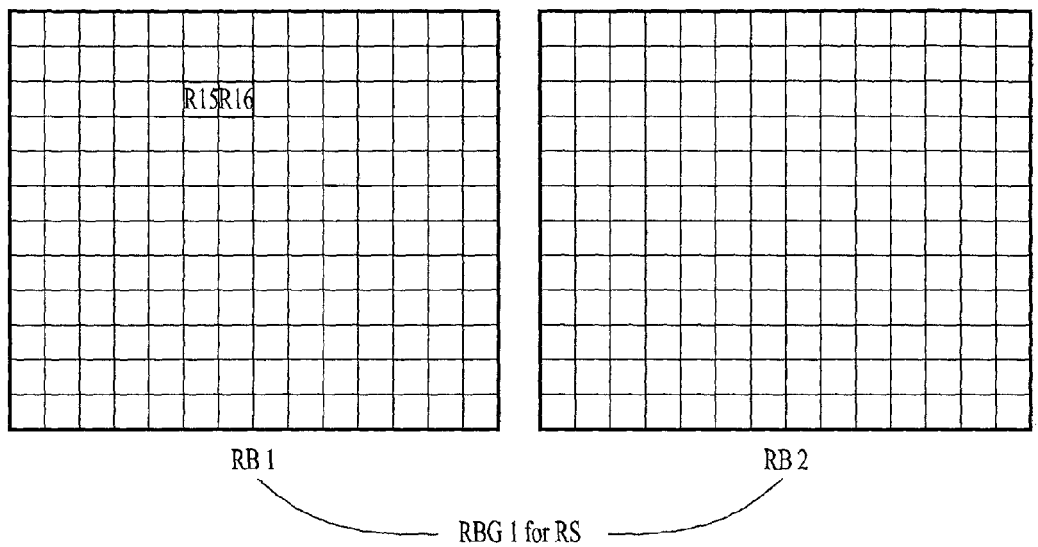
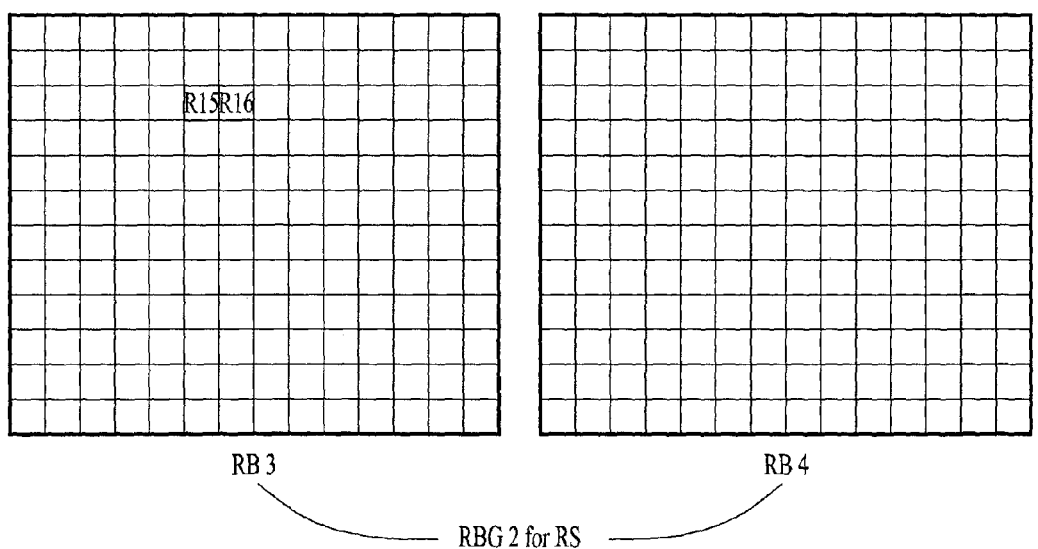

FIG. 12
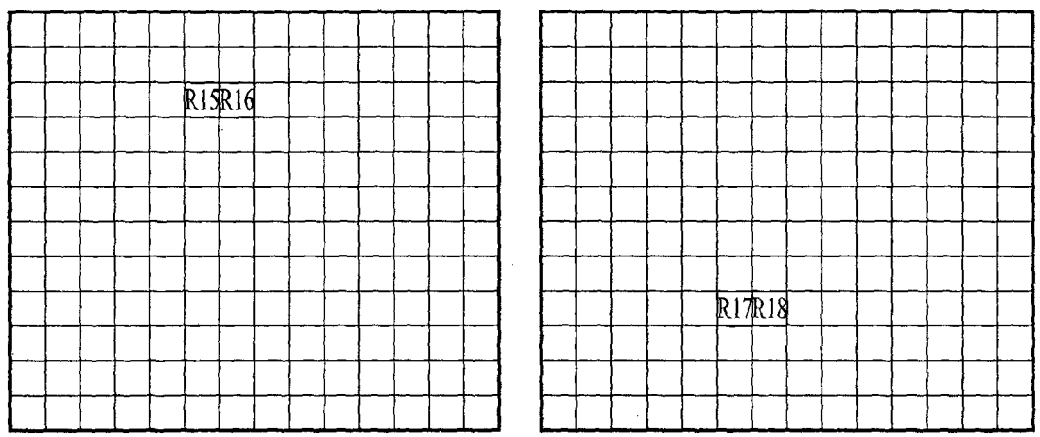
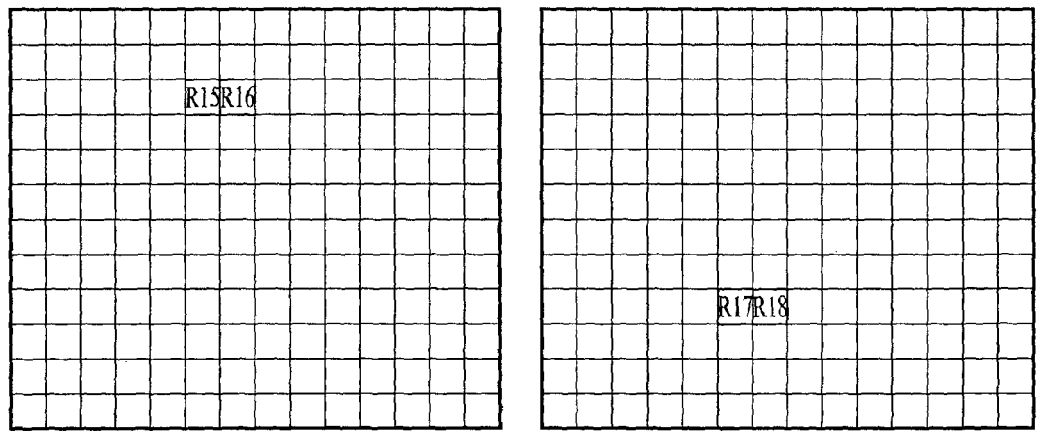
Ports 15 and 16 = Antenna group 1
Ports 17 and 18 = Antenna group 2

Antenna port 8

Antenna port 9

REFERENCE SIGNALS EXTENSION FOR MASSIVE MIMO SYSTEM

This application is a National Phase Application of International Application No. PCT/KR2014/001427, filed on Feb. 21, 2014, which claims the benefit of U.S. Provisional Application No. 61/829,198, filed May 30, 2013, which are hereby incorporated by reference in their entirety for all purposes as if fully set forth herein.

TECHNICAL FIELD

The present invention relates to a wireless communication system, and more particularly, to methods of transmitting reference signals for a massive MIMO system and apparatuses therefor.

BACKGROUND ART

3GPP LTE (3rd generation partnership projecting long term evolution) communication system is schematically described for one example of a wireless communication system to which the present invention is applicable.

FIG. 1 is a schematic diagram of E-UMTS network structure as an example of a wireless communication system.

E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110*a* and 110*b* and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

Technical Problem

Based on the above-mentioned discussion, methods of transmitting reference signals for a massive MIMO system and apparatuses therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method for a base station having multiple antennas to transmit reference signals to user equipments (UEs), the method comprising: grouping 'M' resource blocks (RBs) into a resource block group, wherein the 'M' is greater than 1, wherein a number of the multiple antennas is greater than 8; grouping one or more antenna ports into one antenna group, wherein each of the antenna ports corresponds to each of the multiple antennas; mapping the reference signals of the one antenna group into only one RB within one resource block group; and transmitting the reference signals to the UEs, is provided.

In another aspect of the present invention, a method for a user equipment (UE) to receive reference signals from one or more base stations, the method comprising: receiving the reference signals from the base stations, wherein 'M' resource blocks (RBs) are grouped into a resource block group, wherein the is greater than 1, wherein the reference signals are transmitted by 8 or more antennas, wherein one or more antenna ports are grouped into one antenna group, wherein each of the antenna ports corresponds to each of the multiple antennas, wherein the reference signals of the one antenna group are received via only one RB within one resource block group; and estimating channel based on the received reference signals, is provided.

In another aspect of the present invention, a base station device comprising: multiple antennas to transmit reference signals to user equipments (UEs), wherein a number of the multiple antennas is greater than 8; and a processor connected to the multiple antennas, and adapted to: group 'M' resource blocks (RBs) into a resource block group, wherein the 'M' is greater than 1, group one or more antenna ports into one antenna group, wherein each of the antenna ports corresponds to each of the multiple antennas; map the reference signals of the one antenna group into only one RB within one resource block group, is provided.

In still another aspect of the present invention, a method for a user equipment (UE) to receive reference signals from one or more base stations, the method comprising: receiving the reference signals from the base stations, wherein 'M' resource blocks (RBs) are grouped into a resource block group, wherein the 'M' is greater than 1, wherein the reference signals are transmitted by 8 or more antennas, wherein one or more antenna ports are grouped into one antenna group, wherein each of the antenna ports corresponds to each of the multiple antennas, wherein the reference signals of the one antenna group are received via only one RB within one resource block group; and estimating channel based on the received reference signals, is provided.

The reference signals of different antenna groups may be mapped to different RBs of a same resource block group.

The 'M' can be based on system information. Or, the 'M' can be determined based on a number of co-located Reference Signal ports.

Preferably, the reference signals can be CSI-RS reference signals.

Preferably, a reference signal of an antenna port 'p' among the antenna ports can be mapped to resource block 'r' based on an equation of:

$$r = P \bmod M + nM + o$$

wherein the 'P' corresponds to a sequence of the antenna port 'p' among the antenna ports transmitting the reference signals, the 'n' corresponds to the number of resource block groups, and the 'o' corresponds to an offset value.

Here, the offset value can be determined based on a physical cell ID, a CSI-RS ID, a subframe number or an antenna port index.

Preferably, the base station may transmit signals based on a 3D beam forming scheme using the multiple antennas.

The above-mentioned general description of the present invention and the following details of the present invention are exemplary and may be provided for the additional description of the invention disclosed in claims.

Advantageous Effects

Accordingly, the present invention can efficiently reduce RS overhead problem for massive MIMO operation.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram of structures of control and user planes of a radio interface protocol between a user equipment and E-UTRAN based on 3GPP radio access network specification.

FIG. 11 shows an alternating RB scheme for RS transmission in a system employing massive MIMO.

FIG. 12 shows another example of one embodiment of the present invention.

MODE FOR INVENTION

Figure 1:
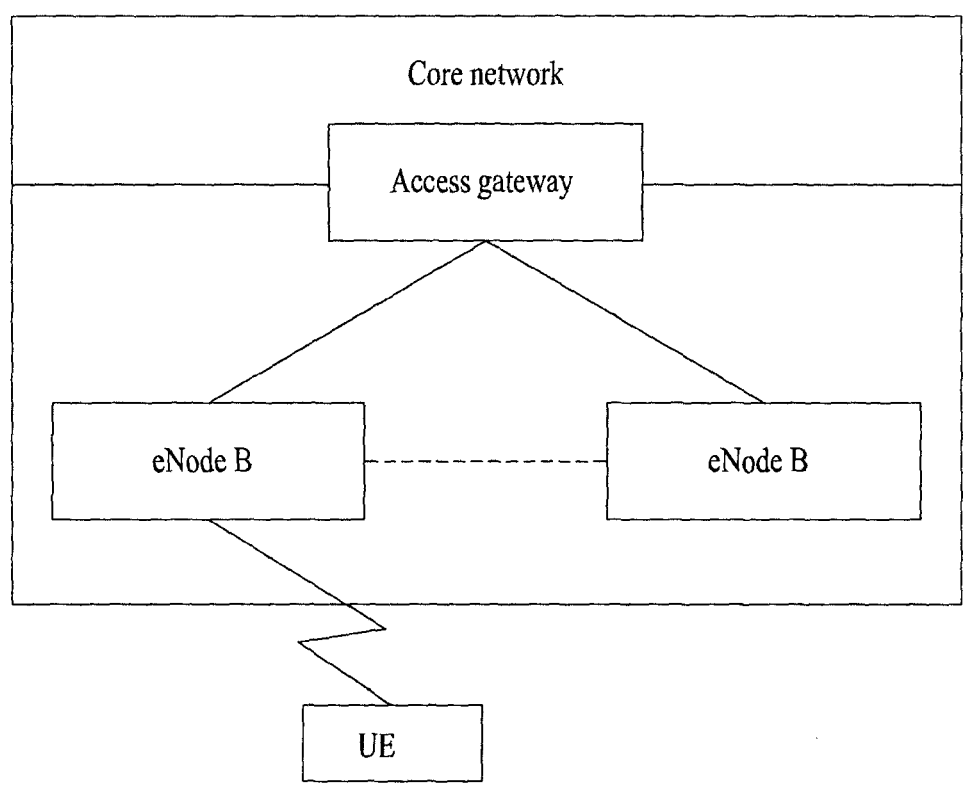
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

In the present specification, a name of a base station can be used as an inclusive terminology for RRH (remote control head), eNB, TP (transmission point), RP (repetition point), RN (relay node) or the like.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
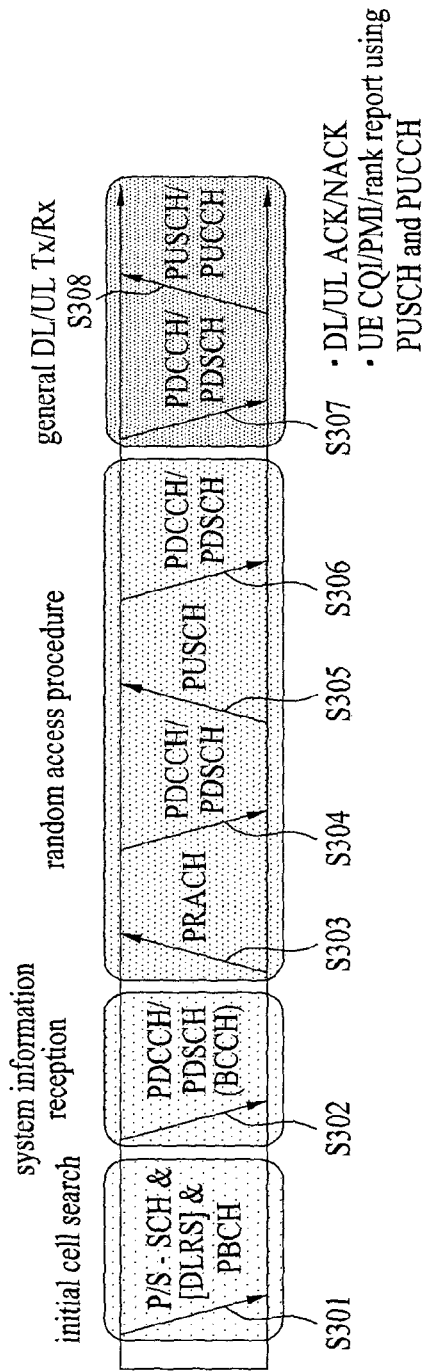
FIG. 3 is a diagram for explaining physical channels used by 3GPP system and a general signal transmitting method using the same.

FIG. 3 is a diagram for explaining physical channels used by 3GPP system and a general signal transmitting method using the same.

Referring to FIG. 3, if a power of a user equipment is turned on or the user equipment enters a new cell, the user equipment performs an initial cell search for matching synchronization with an base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
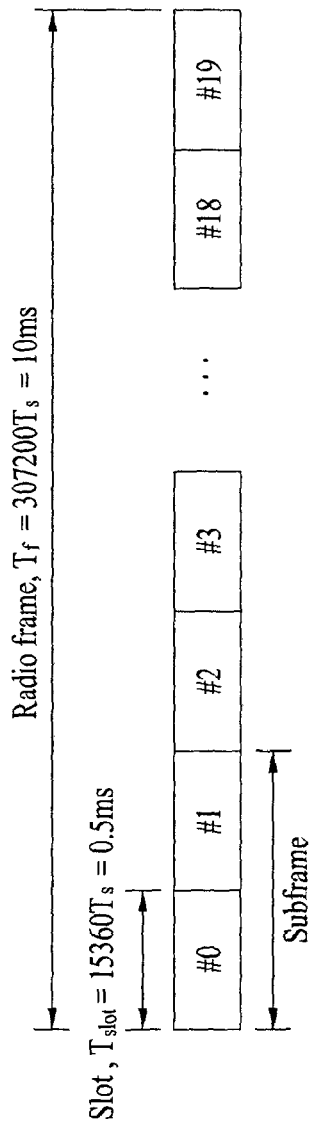
FIG. 4 is a diagram for an example of a structure of a radio frame used by LTE system.

FIG. 4 is a diagram for an example of a structure of a radio frame used by LTE system.

Referring to FIG. 4, a radio frame has a length of 10 ms (327200×Ts) and is constructed with 10 subframes in equal size. Each of the subframes has a length of 1 ms and is constructed with two slots. Each of the slots has a length of 0.5 ms (15360×Ts). In this case, Ts indicates a sampling time and is expressed as Ts=1/(15 kHz×2048)=3.2552×10−8 (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
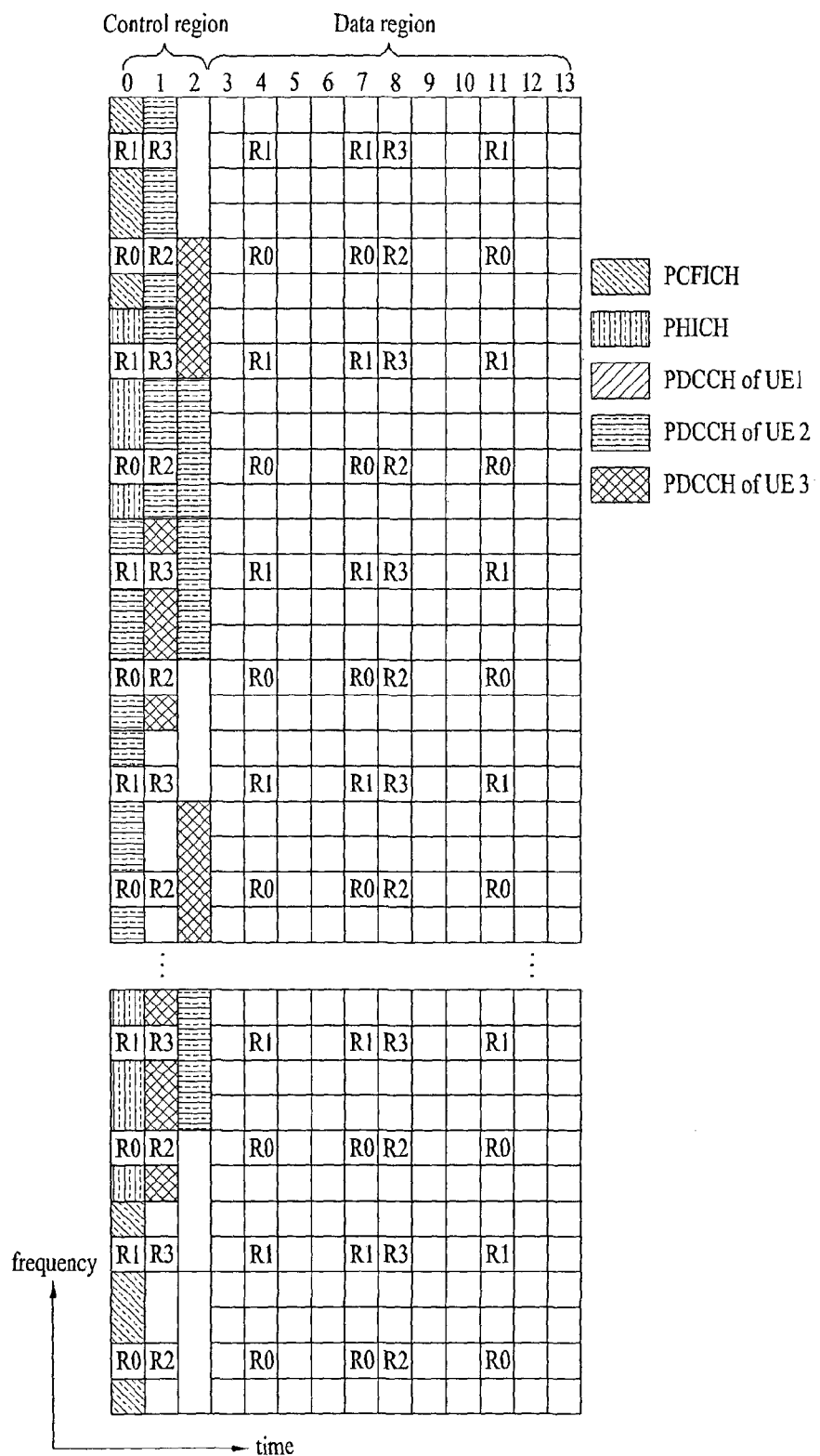
FIG. 5 is a diagram for one example of a control channel included in a control region of one subframe in a downlink (DL) radio subframe.

FIG. 5 is a diagram for one example of a control channel included in a control region of one subframe in a downlink (DL) radio subframe.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four Res, not assigned to RS. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

As explained above, the REs for transmitting RS cannot be used for transmitting control information or data. FIG. 5 is for an example of 4 transmission antenna system. If the number of transmission antennas increase, the RS overhead shall increase. So, one embodiment of the present invention proposes alternating RBs for transmitting RS instead of transmitting RS per every RB. This scheme can efficiently reduce the RS overhead especially in a system employing massive MIMO system. Hereinafter, the massive MIMO system in accordance with one embodiment of the present invention will be explained.

First of all, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

Figure 6:
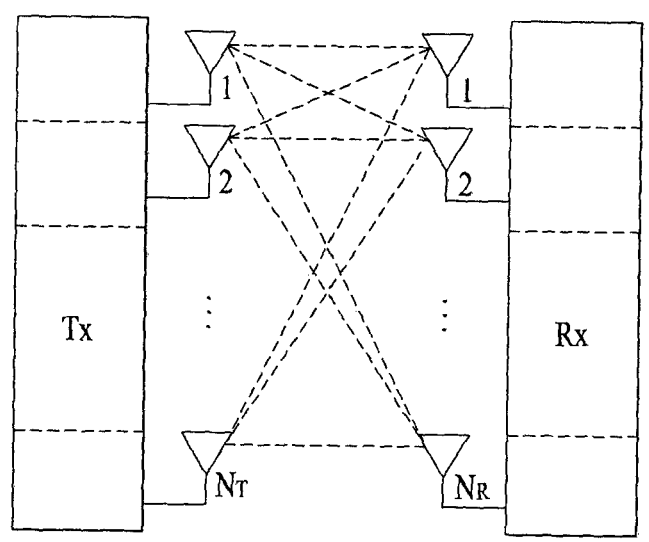
FIG. 6 is a diagram for a configuration of a general multi-antenna (MIMO) communication system.

FIG. 6 is a diagram for a configuration of a general multi-antenna (MIMO) communication system.

$N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Equation 1. In this case, $R_i$ is a smaller one of $N_T$ and $N_R$.

$$R_i = \min(N_T, N_R) \qquad \text{[Equation 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 6, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Equation 2.

$$s = [s_1, s_2, \ldots, s_{N_T}]^T \qquad \text{[Equation 2]}$$

Meanwhile, transmission powers can be set different from each other for transmission informations $s^1$, $s^2$, ..., $s_{N_T}$, respectively. If the transmission powers are set to $P^1$, $P^2$, ..., $P_{N_T}$, respectively, the transmission power adjusted transmission information can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

And, $\hat{S}$ may be represented as Equation 4 using a diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_2 \\ s_2 \\ \vdots \\ s_{N_T} \end{bmatrix} = Ps \qquad \text{[Equation 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Equation 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by equation, a rank of a channel H (i.e., rank (H)) is limited by Equation 6.

$$\text{rank}(H) \leq \min(N_T, N_R) \qquad \text{[Equation 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Equation 7.

$$\text{\# of streams} \leq \text{rank}(H) \leq \min(N_T, N_R) \qquad \text{[Equation 7]}$$

In this case, of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

In the following description, an active antenna system (AAS) and a 3-dimensional (3D) beamforming of one embodiment of the present invention are explained.

First of all, in an existing cellular system, a base station reduces inter-cell interference and enhances throughput (e.g., SINR (signal to interference plus noise ratio)) of user equipments in a cell, using a mechanical tilting or an electrical tilting. This is described in detail with reference to the accompanying drawings as follows.

Figure 7:
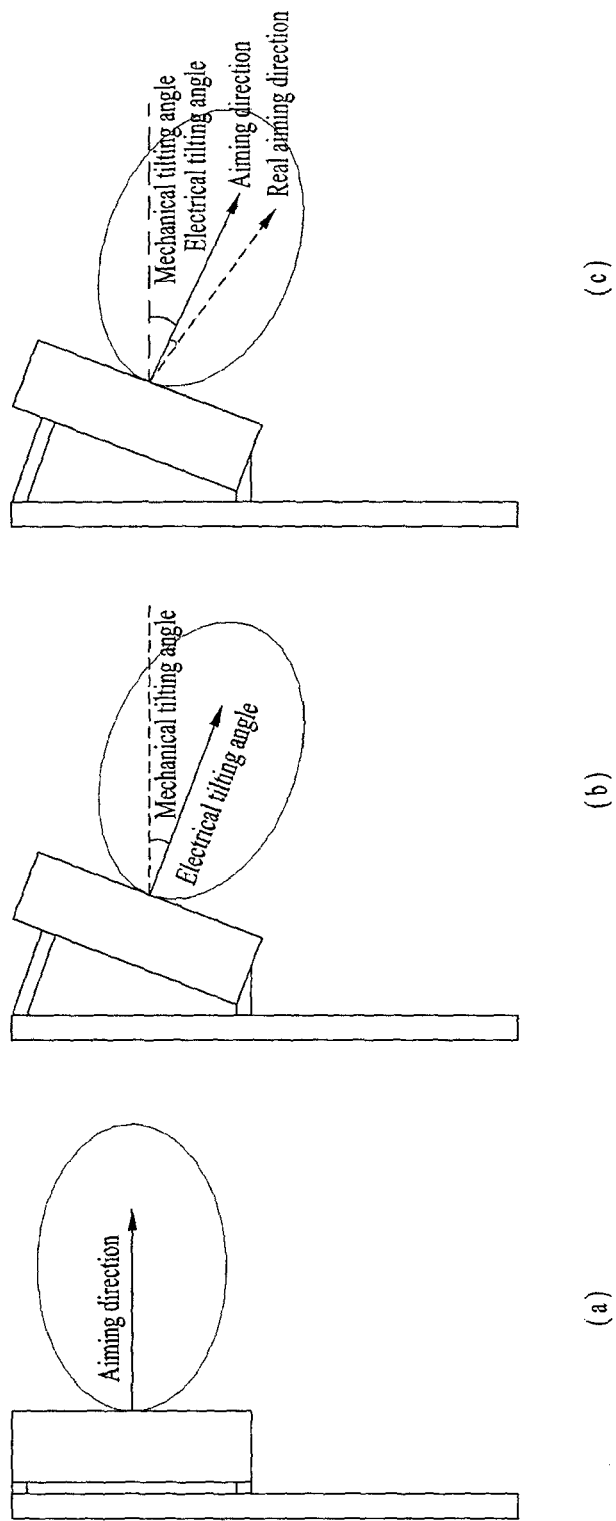
FIG. 7 is a diagram to describe an antenna tilting system.

FIG. 7 is a diagram to describe an antenna tilting system. Particularly, FIG. 7 (a) shows an antenna structure to which an antenna tilting is not applied. FIG. 7 (b) shows an antenna structure to which a mechanical tilting is applied. And, FIG. 7 (c) shows an antenna structure to which both a mechanical tilting and an electrical tilting are applied.

Comparing FIG. 7 (a) and FIG. 7 (b) to each other, regarding a mechanical tilting, as shown in FIG. 7 (b), it is disadvantageous in that a beam direction is fixed in case of an initial installation. Moreover, regarding an electrical tilting, as shown in FIG. 7 (c), despite that a tilting angle is changeable using an internal phase shift module, it is disadvantageous in that a very restrictive vertical beamforming is available only due to a substantially cell-fixed tilting.

Figure 8:
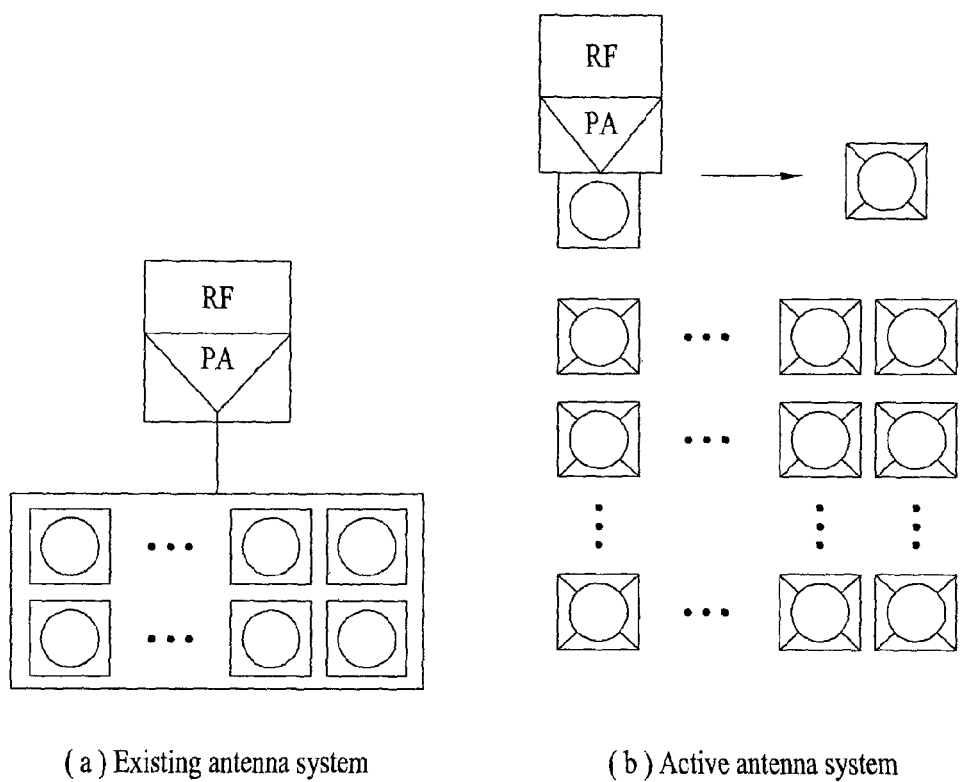
FIG. 8 is a diagram for one example of comparing an existing antenna system and an active antenna system to each other.

FIG. 8 is a diagram for one example of comparing an existing antenna system and an active antenna system to each other.

Particularly, FIG. 8 (a) shows an existing antenna system, while FIG. 8 (b) shows an active antenna system.

Referring to FIG. 8, in an active antenna system, unlike an existing antenna system, each of a plurality of antenna modules includes active devices such as a power amplifier, an RF module and the like. Hence, the active antenna system is capable of controlling/adjusting a power and phase for each of the antenna modules.

In a generally considered MIMO antenna structure, a linear antenna (i.e., 1-dimensional array antenna) like a ULA (uniform linear array) antenna is taken into consideration. In this 1-dimensional array structure, a beam generable by beamforming exists in a 2-dimensional plane. This applies to a PAS (passive antenna system) based MIMO structure of an existing base station. Although vertical antennas and horizontal antennas exist in the PAS based base station, since the vertical antennas are combined into one RF module, beamforming in vertical direction is impossible but the above-mentioned mechanical tilting is applicable only.

Yet, as an antenna structure of a base station evolves into AAS, an independent RF module is implemented for each antenna in a vertical direction, whereby a beamforming in a vertical direction is possible as well as in a horizontal direction. Such a beamforming is called an elevation beamforming.

According to the elevation beamforming, generable beams can be represented in a 3-dimensional space in vertical and horizontal directions. Hence, such a beamforming can be named a 3-dimensional (3D) beamforming. In particular, the 3D beamforming is possible because the 1D array antenna structure is evolved into a 2D array antenna structure in a plane shape. In this case, the 3D beamforming is possible in a 3D array structure of a ring shape as well as in a planar-shaped antenna array structure. The 3D beamforming is characterized in that an MIMO process is performed in a 3D space owing to antenna deployments of various types instead of an existing 1D array antenna structure.

Figure 9:
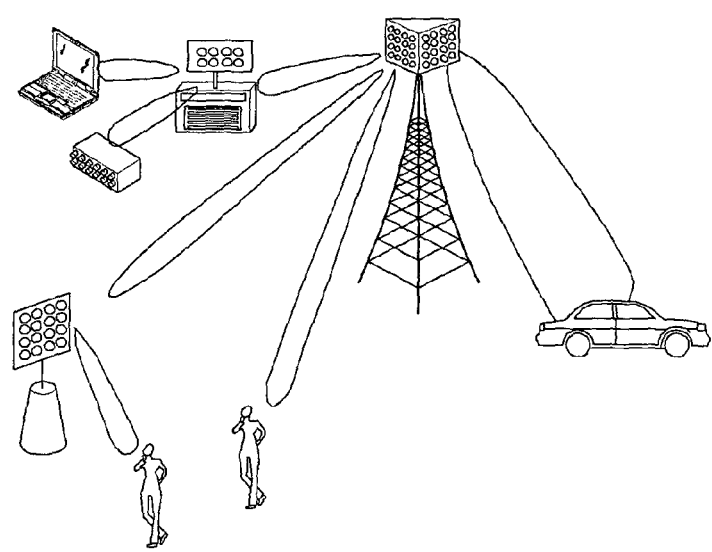
FIG. 9 is a diagram for one example of forming a UE-specific beam based on an active antenna system.

FIG. 9 is a diagram for one example of forming a UE-specific beam based on an active antenna system.

Referring to FIG. 9, owing to the 3D beamforming, a beamforming is possible in case that a user equipment moves back and forth as well as in case that the user equipment moves right and left to the base station. Hence, it can be observed that a higher degree of freedom is provided to a UE-specific beamforming.

Moreover, as a transmission environment using an active antenna based 2D array antenna structure, an environment (O2I: outdoor to indoor) of a transmission from an outdoor base station to an indoor user equipment, an environment (indoor hotspot) of a transmission from an indoor base station to an indoor user equipment or the like can be considered as well as an environment of a transmission from an outdoor base station to an outdoor user equipment.

Figure 10:
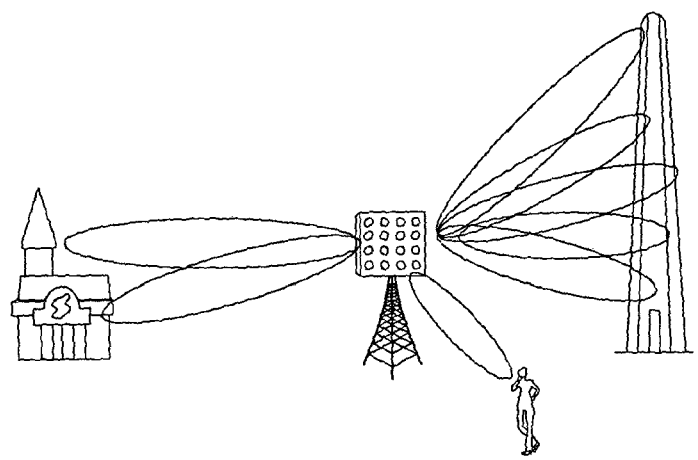
FIG. 10 is a diagram of a 2-dimensional (2D) beam transmission scenario based on an active antenna system.

FIG. 10 is a diagram of a 2-dimensional (2D) beam transmission scenario based on an active antenna system.

Referring to FIG. 10, assuming a real cell environment in which a plurality of various buildings exist within a cell, a base station needs to consider a vertical beam steering capability in consideration of various user equipment heights in accordance with a building height as well as a UE-specific horizontal beam steering capability. Considering such a cell environment, it is necessary to reflect channel characteristics (e.g., radio shadow/path loss variation due to a height difference, fading characteristic change, etc.) considerably different from an existing radio channel environment.

So to speak, a 3D beamforming, which is evolved from a horizontal beamforming performed in a horizontal direction only based on an antenna structure of an existing linear 1D array, indicates an MIMO processing scheme performed in a manner of being extended to and combined with an elevation beamforming or a vertical beamforming based on an antenna structure of multi-dimensional arrays including a planar array and the like.

In addition to or instead of the above mentioned Adaptive antenna system and 3D beam forming scheme, one embodiment of the present invention proposes using massive MIMO system.

In the LTE system, the maximum number of antennas for downlink transmission is 4. In the LTE-Advanced system, the maximum number of antennas for downlink transmission is 8 and the maximum number of antennas for uplink transmission is 4. But, demand for high speed transmission leads to the concept of massive MIMO system.

Based on this, the concept of massive MIMO system of the present application will be explained.

Recently, the massive MIMO scheme got lots of attention as a candidate constituent technology for 5G mobile communication system. This massive MIMO scheme can be employed to the system including a base station having multiple antennas and UEs having one antenna. Even though each UE has only one antenna, the entire system can be viewed as MIMO system when multiple UEs served by the base station having multiple antennas. If we assume that the number of UEs is K, the gradation of capacity in high SNR may be expressed as $\min(N_t, K)$.

The number of antennas for the base station can be unlimited. But, practically, we can suppose that the number of antennas of a base station exceed a certain threshold number, in order to distinguish the massive MIMO scheme from the conventional MIMO scheme. This threshold value can be 4 or 8, for example, but we suppose the case when the number of antenna for one base station is much more than this exemplary threshold number.

Theoretically, when the number of antennas for one base station goes to infinite, the optimal transmission algorism of the base station may be MRT (maximal ration transmission), and optimal reception algorithm may be MRC (maximal ration combining). These MRT and MRC are simple, but the performance of these schemes is limited when the conventional MIMO scheme is used, because these schemes do not consider the interference. However, when the number of antennas for one base station goes to infinite, the above drawback is addressed. Also, if the number of antennas increases, the beam from one antenna can be sharp, so the signal from that antenna can be carried to the received without giving interference to other receivers.

When the above explained massive MIMO scheme is used, the number of antennas dramatically increases, so RS overhead shall be serious problem. And, when 3D beamforming or massive MIMO is employed, the RRH may use tens or hundreds of antennas for transmission. CSI-RS ports for supporting these shall be increased. To address this issue, the following solutions can be used.

1. Multiple CSI-RS Resources

The base station may group the multiple antenna into sub-array, and allocate one CSI-RS for one sub array 2. Increase Maximum Number of CSI-RS Ports within a CSI-RS Resource Increasing the maximum number of CSI-RS ports in a single CSI-RS pattern CSI-RS ports can be newly defined from port #23

3. Defining New RS

New channel estimation RS can be newly defined

The above solutions can be employed together. The present invention proposes alternating RB scheme to efficiently reduce RS overhead and reuse the RS pattern of conventional technology.

FIG. 11 shows an alternating RB scheme for RS transmission in a system employing massive MIMO.

According to the one embodiment of the present invention, when the base station uses the above explained massive MIMO system, 'M' RBs are grouped into a RB group (M>1). 'M' can be determined based on system information. In the example of FIG. 11, 'M' corresponds to 2. So, RB 1 and RB 2 are grouped into RBG 1, and RB 3 and RB 4 are grouped into RGB 2, and so on.

To distinguish the massive MIMO system over the conventional MIMO system, we may suppose the number of antennas is greater than 8, but practically, the number of antennas shall be much more than 8. Further, one or more antenna ports are grouped into an antenna group. In FIG. 11, antenna ports 15 and 16 are grouped into one antenna group. Different antenna ports may be grouped into different antenna group.

According to this embodiment, the base station may map the reference signals of the one antenna group into only one RB within one resource block group. Conventionally, RSs of each antenna are mapped to every RB based on the predetermined RS pattern. But, in order to reduce the RS overhead, the present embodiment proposes to map the RSs of one antenna group into only one RB within one RBG. In FIG. 11, the RBs of antenna ports 15 and 16 are mapped only to RB 1 within RBG 1 and RB 3 within RBG 2, and so on.

FIG. 12 shows another example of one embodiment of the present invention.

As stated above, according to the one embodiment of the present invention, when the base station uses the above explained massive MIMO system, 'M' RBs are grouped into a RB group (M>1). And, one or more antenna ports are grouped into an antenna group. In FIG. 12, antenna ports 15 and 16 are grouped into one antenna group (antenna group 1). And, antenna ports 17 and 18 are grouped into another antenna group (antenna group 2). Different antenna ports may be grouped into different antenna group.

According to the present embodiment, the base station may map the RSs of different antenna groups to different RBs of the same RBG. For each antenna group, the base station maps the reference signals of the one antenna group into only one RB within one resource block group. In FIG. 12, RSs of antenna group 1 are mapped only to RB 1 and RB 3, and RSs of antenna group 2 are mapped only to RB 2 and RB 4.

Based on these schemes, the RS overhead can be efficiently reduced.

As stated above, when the number of antennas increase, the RS overhead problem become more serious. Furthermore, there are various kinds of RSs in addition to the RS explained in FIG. 5. Hereinafter, downlink reference signals in the LTE system will be explained.

First of all, a reference signal already known to both a transmitting side and a receiving side is generally transmitted for channel measurement to the receiving side from the transmitting side together with data. This reference signal is provided for the channel measurement and also indicates a modulation scheme to play a role in enabling a demodulation process. Reference signals can be categorized into a dedicated reference signal (DRS) for a specific user equipment (UE) and a dedicated reference signal for a base station, i.e., a UE-specific reference signal and a common reference signal (common RS or CRS (cell-specific RS) that is a cell-specific reference signal for all user equipments within a cell. Moreover, the cell-specific reference signal includes a reference signal for measuring and reporting CQI/PMI/RI to a base station from a user equipment. And, such a reference signal is called CSI-RS (channel state information-RS).

To sum, in the LTE system, the following downlink RSs are used.

(1) Cell Specific RS: RSs for Channel Estimation

Cell specific RS (CRS) may be used for CSI measurement/reporting purpose. As the short term measurement, these RSs are used for link adaptation, rank adaptation, closed loop MIMO precoding. As long term measurement, these RSs are used for handover, cell selection/reselection etc.

(2) Demodulation RS: RSs for Receiving Downlink Physical Channel.

(3) Positioning RS: RSs for Estimating the Location of the UE.

(4) MBSFN RS: RSs for Multicase/Broadcast Service.

In the LTE system, the RSs for channel measurement is CRS. But, in LTE-A system, to reduce RS overhead, a separate CSI-RS is defined for CSI measurement purpose, and UE-specific RS is used for PDSCH reception. CSI-RS may be characterized for CSI measurement and feedback. It is transmitted with lower density comparing to the CRS. CRS can supports upto 4 antennas, but CSI-RS supports upto 8 antennas, UE-specific RS is designed for demodulating data channel and it is transmitted after MIMO precoding is performed as data. So, UE-specific RS needs not to be transmitted via every antenna contrary to CRS, but it is enough to be transmitted via antennas transmitting data. It may correspond to the number of layers simultaneously transmitted.

Hereinafter, each of the downlink RSs is explained in detail.

Figure 13:
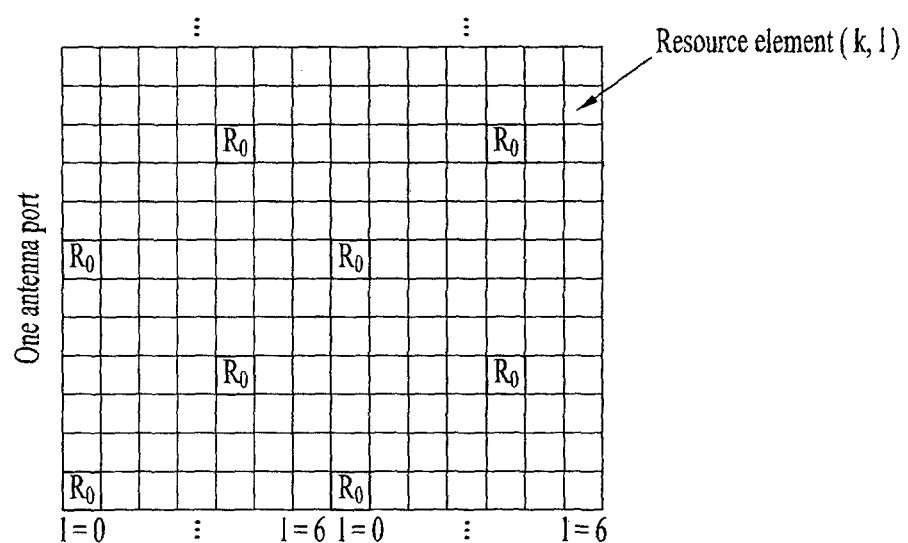
FIG. 13 is for CRS pattern for one antenna port.
Figure 14:
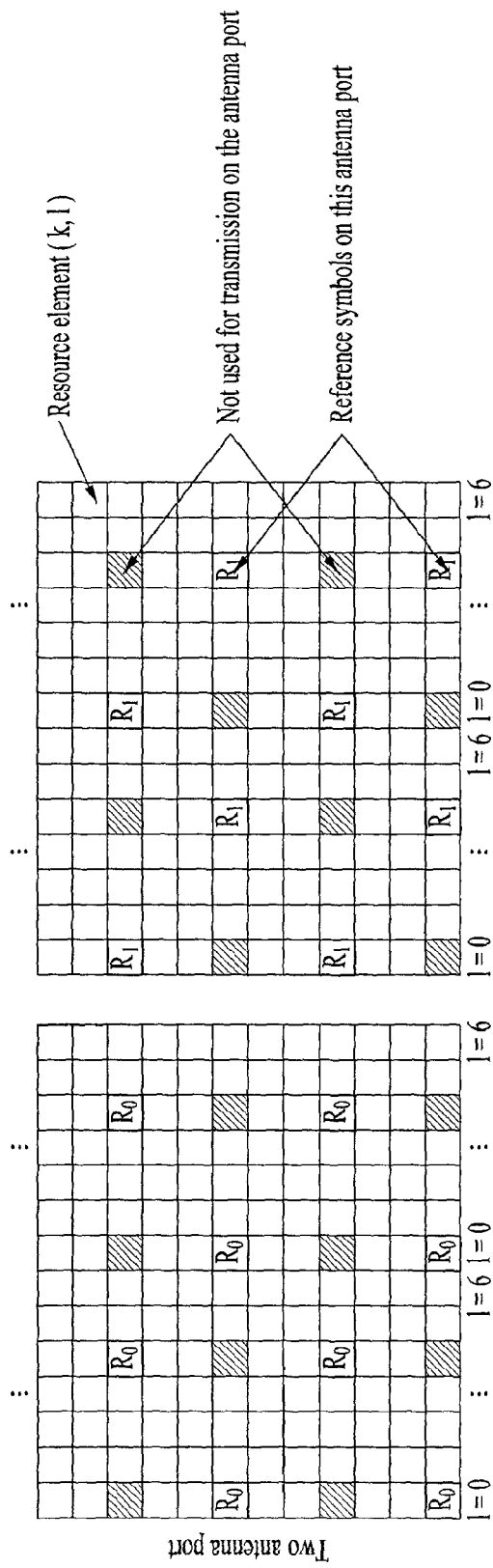
FIG. 14 is for CRS pattern for two antenna ports.
Figure 15:
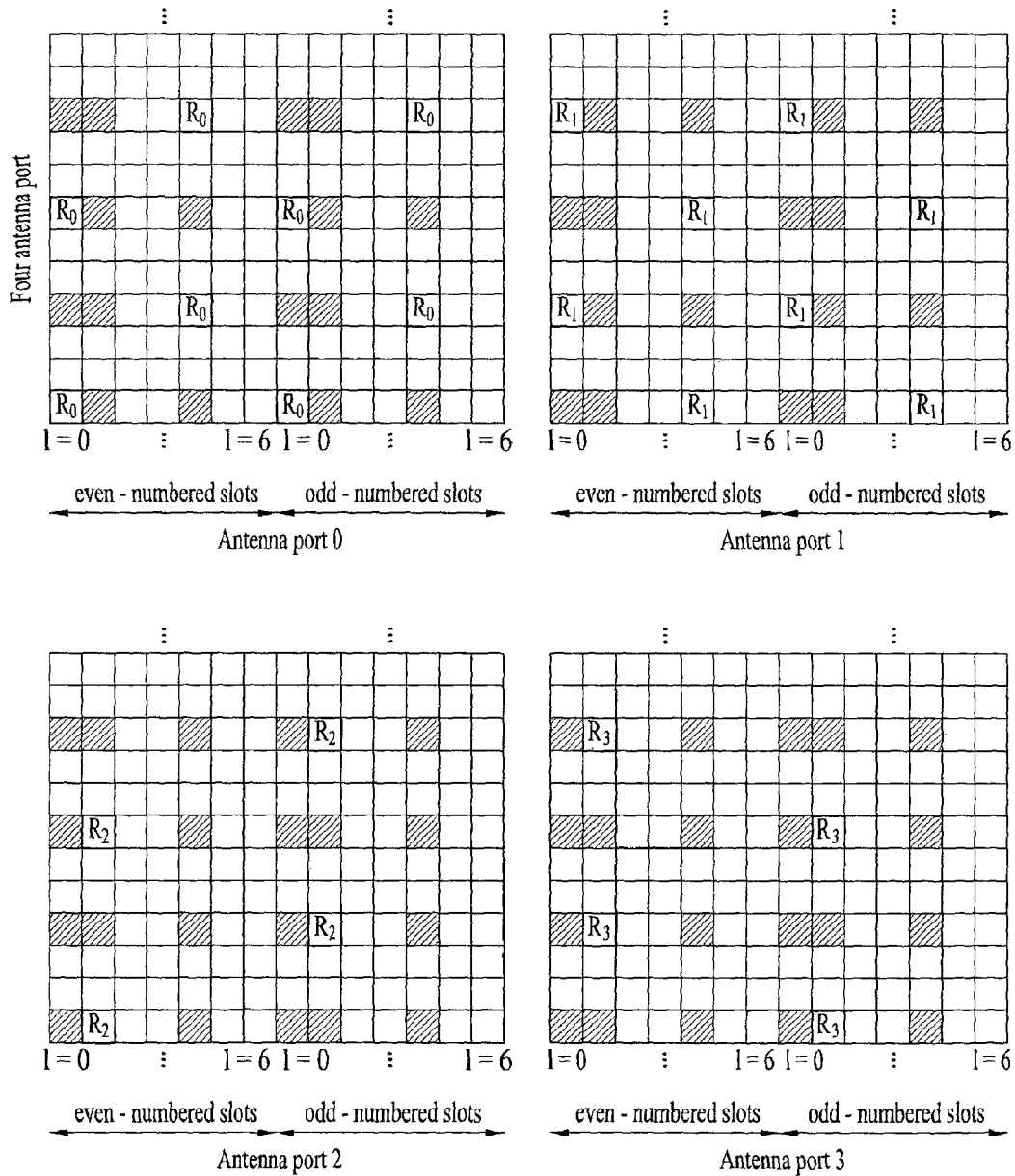
FIG. 15 is for CRS pattern for four antenna ports.

FIGS. 13 to 15 are RS pattern for transmitting CRS. Specifically, FIG. 13 is for CRS pattern for one antenna port, FIG. 14 is for CRS pattern for two antenna ports, and FIG. 15 is for CRS pattern for four antenna ports.

CRSs are transmitted in very subframe where PDSCH is transmitted. And, CRSs are transmitted via antenna ports 0~3, and they supports only $\Delta f$=15 kHz. Pseudo-random sequence $r_{l,n_s}(m)$ with seed value based on cell ID is modulated to produce complex-symbols of $a_{k,l}^{(p)}$, and they are used for these RSs. Here, 'p' represent antenna port, $n_s$ represents slot number, 'l' represents OFDM symbol index, and 'k' represents subframe index.

The position of each complex symbol is determined based on the following equations.

$$l = \begin{cases} 0, N_{symb}^{DL} - 3 & \text{if } p \in \{0, 1\} \\ 1 & \text{if } p \in \{2, 3\} \end{cases} \quad \text{[Equation 8]}$$

$$k = 6m + (v + v_{shift}) \bmod 6, \; v_{shift} = N_{ID}^{cell} \bmod 6 \quad \text{[Equation 9]}$$

That is, 'l' is determined based on an antenna port and 'k' is differently determined based on the cell ID. FIGS. 13-15 shows the RS pattern according to the above equations.

As shown in FIGS. 14 and 15 if a specific RE is taken by one antenna port, it cannot be used by another antenna port. Also, within a MBSFN subframe, CRSs are mapped only to the non-MBSFN region.

The above explained embodiment of the present invention can be applied to extend the above CRSs over 8 Tx system. However, the preferred embodiment of the present invention proposes to apply the above mentioned embodiment to CSI-RS to effectively reduce the RS overhead in the massive MIMO system.

CSI-RS supports 1, 2, 4 and 8 antenna ports using p=15~22. In the LTE-A system, it only supports $\Delta f$=15 kHz, but the present invention may not be limited to such.

Figure 16A:
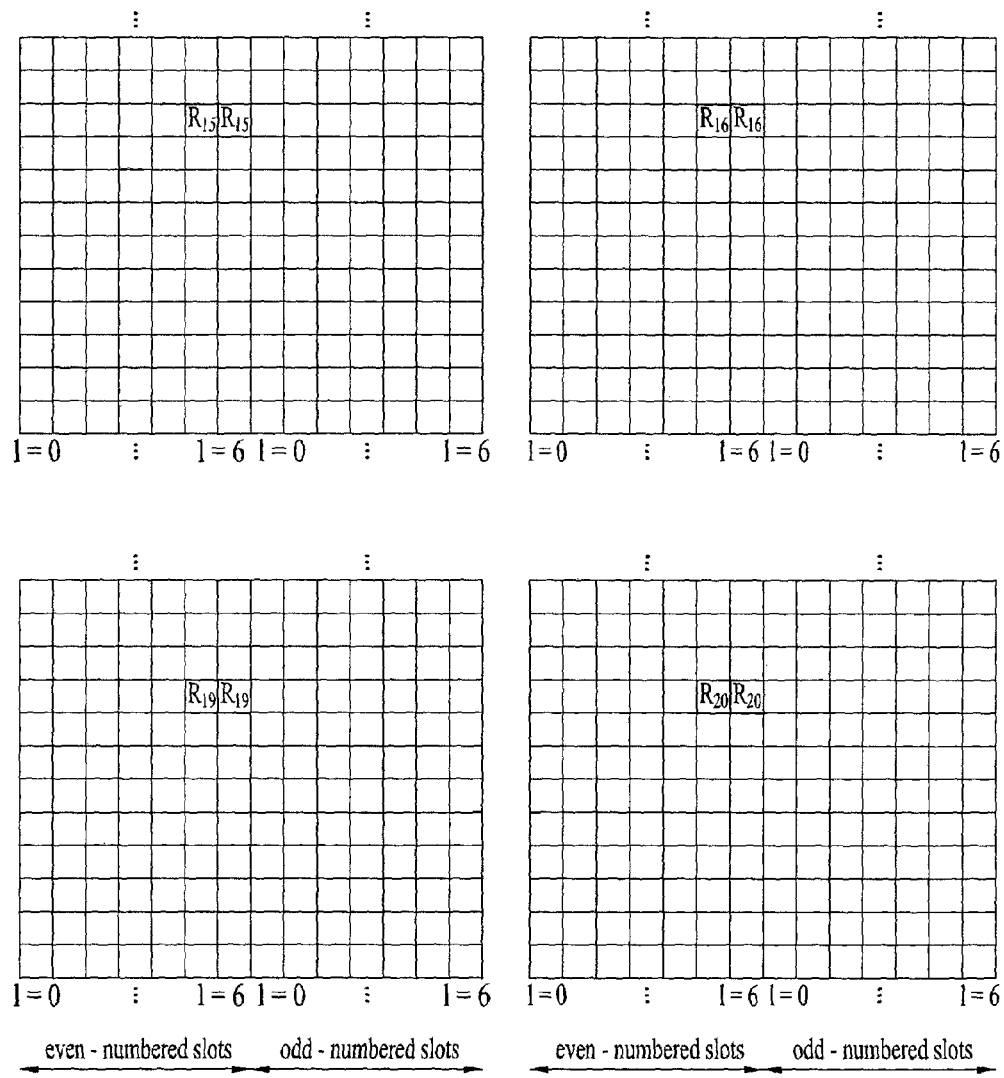
FIG. 16 shows RS pattern for CSI-RS to be used for one embodiment of the present invention.
Figure 16B:
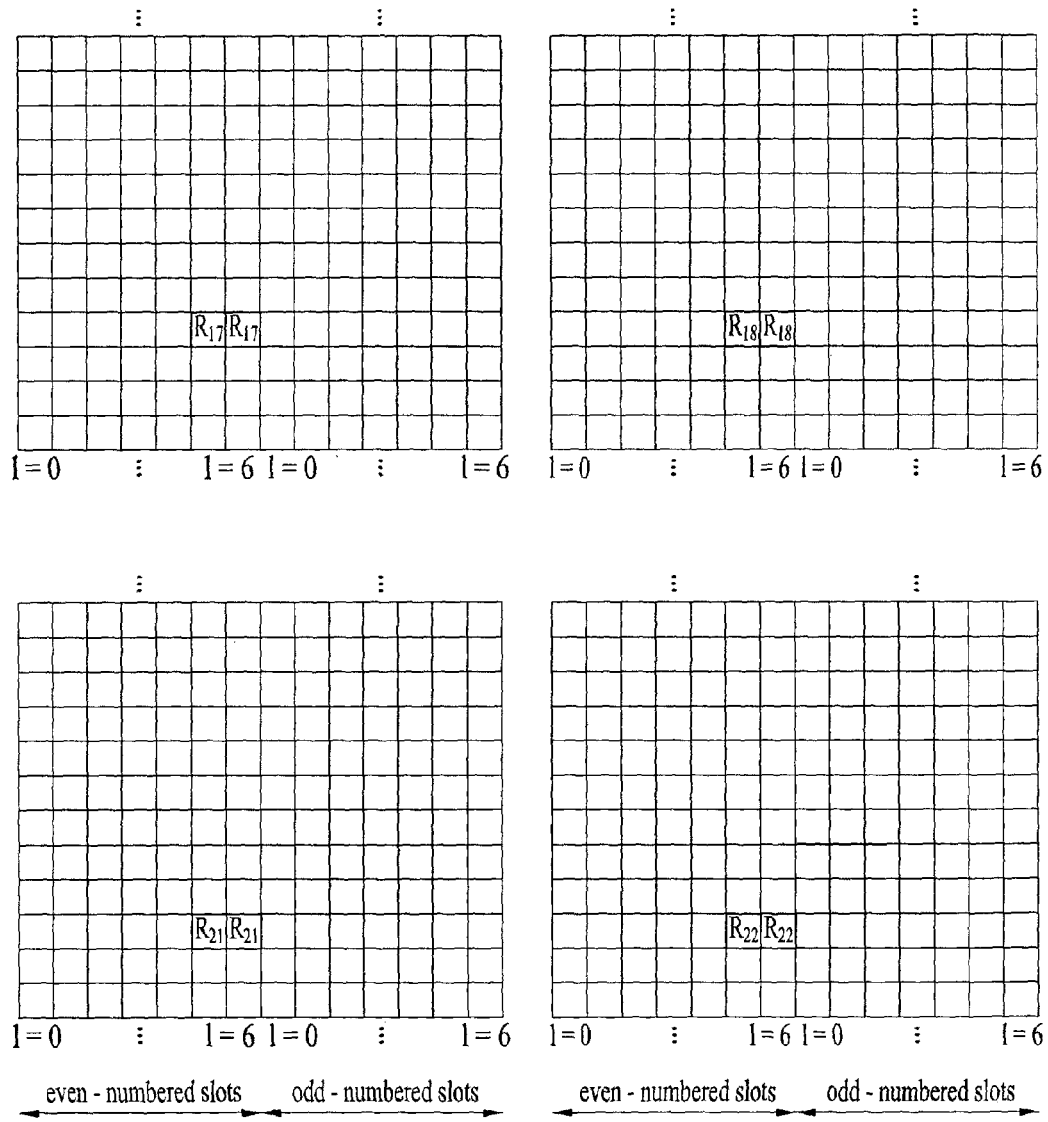

FIG. 16 shows RS pattern for CSI-RS to be used for one embodiment of the present invention.

Pseudo-random sequence $r_{l,n_s}(m)$ with seed value of Cell ID $N_{ID}^{cell}$ or CSI-RS ID $N_{ID}^{CSI}$ can be modulated into complex value symbols of $a_{k,l}^{(p)}$. Here, 'p' represent antenna port, $n_s$ represents slot number, 'l' represents OFDM symbol index, and 'k' represents subframe index. The positions of CSI-RSs can be determined based on the following equations.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \end{cases} \quad [\text{Equation 10}]$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \end{cases} \quad [\text{Equation 11}]$$

That is, 'k' can be determined based on antenna ports, and 'l' can be determined based on the configuration as shown in the following table.

corresponds to the lowest CSI-RS configuration index, and the correspondence increase according to the configuration index.

In this embodiment, CSI-RS is not transmitted on the following subframes.

In the special subframe in Frame Structure type 2.

In the subframe where CSI-RS collides with synchronization signals, PBCH, SystemInformationBlockType1 messages.

In the subframe where paging message is transmitted.

In the set S where S={15}, S={15,16}, S={17,18}, S={19,20} or s={21,22}, the RE transmitting CSI-RS of one antenna port cannot be used for transmitting PDSCH or CSI-RS of another antenna port.

CSI-RS can be transmitted with periodicity. The subframe configuration of the CSI-RS, $I_{CSI-RS}$, can be set by upper layer signaling as shown in the following table 2.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

FIG. 16 shows a resultant CSI-RS pattern. As shown in FIG. 16, CSI-RS has low density comparing to the above explained CRS.

Within one cell, various CSI-RS configurations can be used. NZP (non-zero power) CSI-RS can use 0 or 1 configuration, and ZP (zero-power) CSI-RS can use 0 or multiple configurations. Various configuration can be set by setting 1 to each bit of 16 bit map representing 16 configurations for 4 ports for ZP CSI-RS in table 1. This bitmap can be indicated by the supper layer signal, ZeroPowerCSI-RS. But, Res set as Non-zero power CSI-RS shall be excluded from the above. In this signaling, MSB (most significant bit)

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

The above explained alternating RB scheme for massive MIMO system can be implemented together with the above subframe configuration of CSI-RS.

Figure 17:
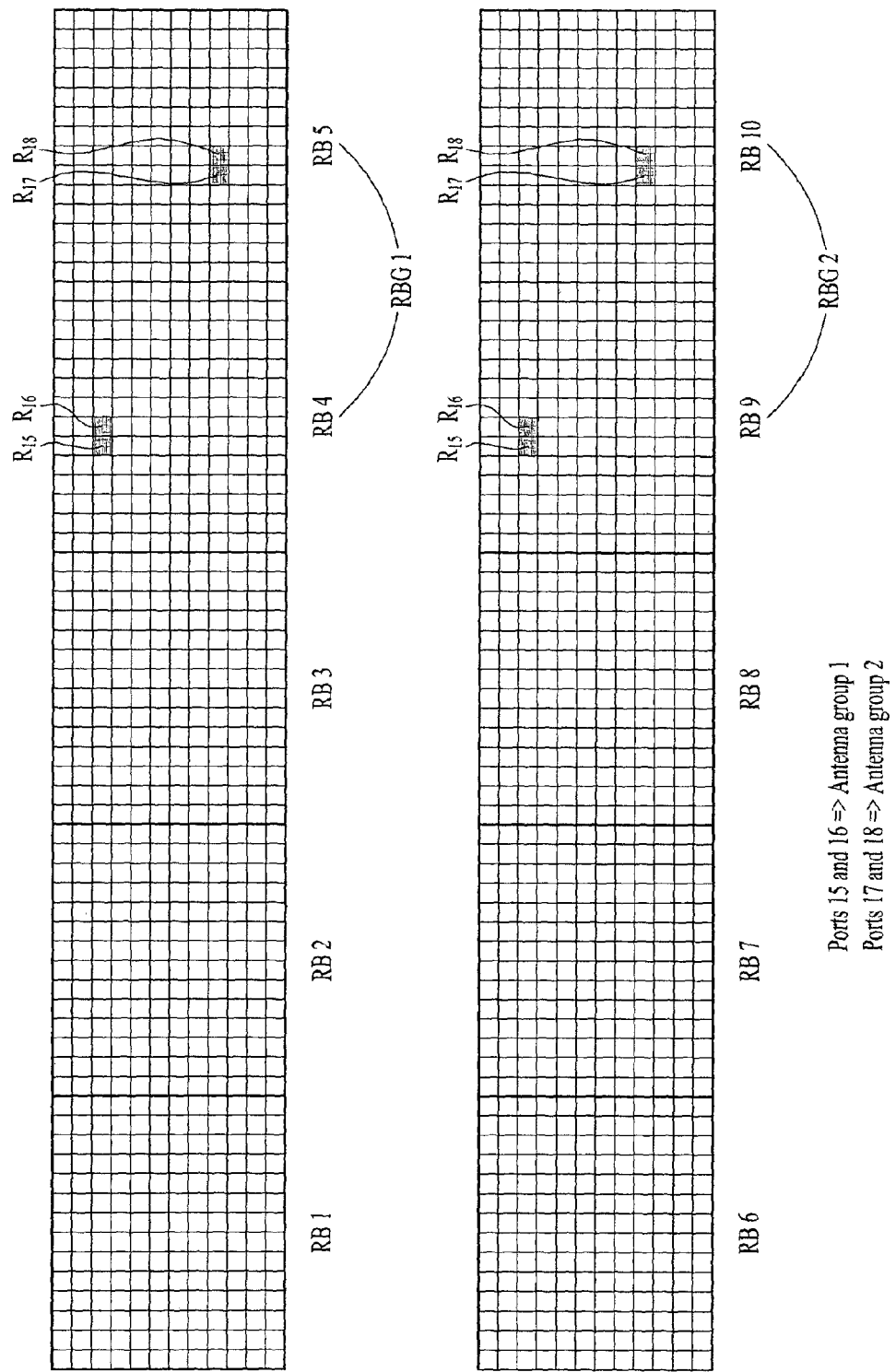
FIG. 17 shows an example according to one embodiment of the present invention for alternating RBs for transmitting CSI-RS with subframe configuration.
Figure 18:
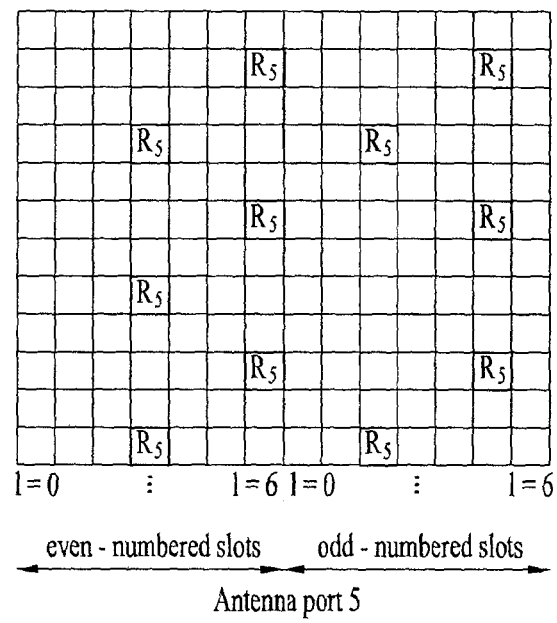
FIGS. 18-22 show RS pattern for DM-RS.
Figure 19:
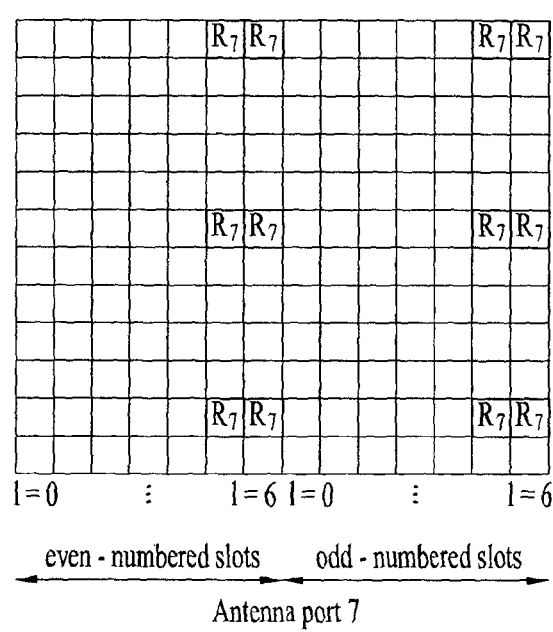
Figure 20:
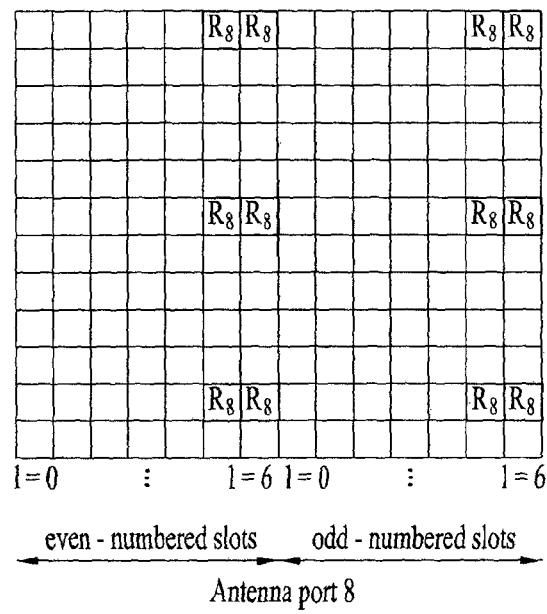
Figure 21:
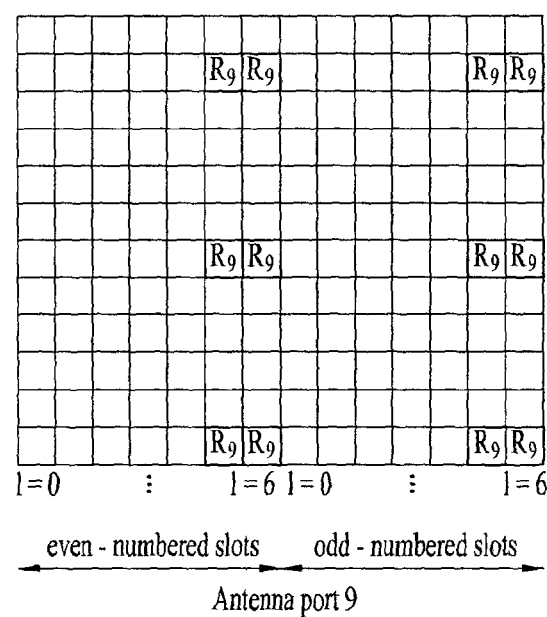
Figure 22:
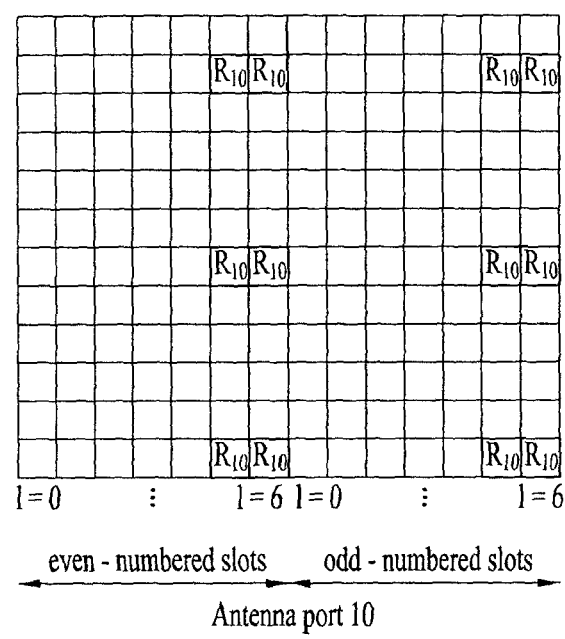

FIG. 17 shows an example according to one embodiment of the present invention for alternating RBs for transmitting CSI-RS with subframe configuration.

In this example, suppose that the number of RB groups (M) corresponds to 2. And, antenna ports 15 and 16 are grouped into antenna group 1 and antenna ports 17 and 18 are grouped into antenna group 2. Further, suppose that the above explained subframe configuration, $I_{CSI-RS}$, for CSI-RS corresponds to 3.

According to the table 2, CSI-RS periodicity shall be 5 and CSI-RS offset shall be 3. So, based on this configuration the base station may start to transmit CSI-RSs at subframes 4, 9, 13, . . . . But, according to the above explained alternating RB scheme, the base station may map the CSI-RSs of antenna ports 15 and 16 only to RB 4, 9, 13, . . . and CSI-RSs of antenna ports 17 and 18 only to RB 5, 10, 15, . . . .

Hereinafter, CSI-RS configuration IE according to one embodiment of the present invention will be explained.

The upper layer signaling for CSI-RS configuration shall be expressed as following table.

The CSI-RS-Config information elements according to one embodiment of the present invention may further comprises information on 'M' and/or antenna grouping information.

Hereinafter, DM-RS (UE-specific RS) will be explained in detail.

For antenna port 5, the UE-specific reference-signal sequence $r_{n_s}(m)$ is defined by:

$$r_{n_s}(m) = \frac{1}{\sqrt{2}}(1 - 2 \cdot c(2m)) + j\frac{1}{\sqrt{2}}(1 - 2 \cdot c(2m+1)), \quad \text{[Equation 12]}$$

$$m = 0, 1, \ldots, 12N_{RB}^{PDSCH} - 1$$

where $N_{RB}^{PDSCH}$ denotes the bandwidth in resource blocks of the corresponding PDSCH transmission. The pseudo-random sequence c(i) shall be initialised with $c_{init} = (\lfloor n_s/2 \rfloor + 1) \cdot (2N_{ID}^{cell}+1) \cdot 2^{16} + n_{RNTI}$ at the start of each subframe where $n_{RNTI}$ is the value of RNTI.

For any of the antenna ports $p \in \{7, 8, \ldots, \upsilon+6\}$, the reference-signal sequence r(m) is defined by:

TABLE 3

| CSI-RS-Config information elements |
|---|

```
-- ASN1START
CSI-RS-Config-r10 ::=       SEQUENCE {
       csi-RS-r10             CHOICE {
           release              NULL,
           setup              SEQUENCE {
               antennaPortsCount-r10       ENUMERATED {an1, an2, an4, an8},
               resourceConfig-r10          INTEGER (0..31),
               subframeConfig-r10          INTEGER (0..154),
               p-C-r10                     INTEGER (-8..15)
           }
       }                                    OPTIONAL,        -- Need ON
       zeroTxPowerCSI-RS-r10    CHOICE {
           release              NULL,
           setup              SEQUENCE {
               zeroTxPowerResourceConfigList-r10 BIT STRING (SIZE (16)),
               zeroTxPowerSubframeConfig-r10     INTEGER (0..154)
           }
       }                                    OPTIONAL         -- Need ON
}
-- ASN1STOP
```

| CSI-RS-Config field descriptions |
|---| antennaPortsCount

Parameter represents the number of antenna ports used for transmission of CSI reference signals where an1 corresponds to 1, an 2 to 2 antenna ports etc.

p-C

Parameter: $P_c$.

resourceConfig

Parameter: CSI reference signal configuration.

subframeConfig

Parameter: $I_{CSI-RS}$.

zeroTxPowerResourceConfigList

Parameter: ZeroPowerCSI-RS.

zeroTxPowerSubframeConfig

Parameter: $I_{CSI-RS}$.

$$r(m) = \frac{1}{\sqrt{2}}(1 - 2 \cdot c(2m)) + j\frac{1}{\sqrt{2}}(1 - 2 \cdot c(2m+1)),$$ [Equation 13]

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

The pseudo-random sequence c(i) shall be initialised with $c_{init}=(\lfloor n_s/2 \rfloor) \cdot (2N_{ID}^{cell}+1) \cdot 2^{16}+n_{SCID}$ at the start of each subframe, where for antenna ports 7 and 8 $n_{SCID}$ is given by the scrambling identity field according to the following table 4 in the most recent DCI format 2B or 2C associated with the PDSCH transmission. If there is no DCI format 2B or 2C associated with the PDSCH transmission on antenna ports 7 or 8, the UE shall assume that $n_{SCID}$ is zero. For antenna ports 9 to 14, the UE shall assume that $n_{SCID}$ is zero.

TABLE 4

| Scrambling identity field in DCI format 2B or 2C [3] | $n_{SCID}$ |
|---|---|
| 0 | 0 |
| 1 | 1 |

UE-specific reference signals are supported for transmission of PDSCH and are transmitted on antenna port(s) p=5, p=7, p=8 or p=7, 8, . . . , υ+6, where υ is the number of layers used for transmission of the PDSCH. UE-specific reference signals are transmitted to one UE on any of the antenna ports in the set S, where S={7,8,11,13} or S={9,10,12,14}.

FIGS. 18-22 show RS pattern for DM-RS.

For antenna ports p=7, p=8 or p=7, 8, . . . , v+6, in a physical resource block with frequency-domain index $n_{PRB}$ assigned for the corresponding PDSCH transmission, a part of the reference signal sequence r (m) shall be mapped to complex-valued modulation symbols $a_{k,l}^{(p)}$ in a subframe according to:

For Normal cyclic prefix [Equation 14]

$$a_{k,l}^{(p)} = w_p(l') \cdot r(3 \cdot l' \cdot N_{RB}^{max,DL} + 3 \cdot n_{PRB} + m')$$

where $$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{if in a } specialsubframe \text{ with configuration 3, 4, or 8} \\ l'\bmod 2 + 2 + 3\lfloor l'/2 \rfloor & \text{if in a } specialsubframe \text{ with configuration 1, 2, 6, or 7} \\ l'\bmod 2 + 5 & \text{if not in a } specialsubframe \end{cases}$$

$$l' = \begin{cases} 0, 1, 2, 3 & \text{if } n_s \bmod 2 = 0 \text{ and in a } specialsubframe \text{ with configuration 1, 2, 6, or 7} \\ 0, 1 & \text{if } n_s \bmod 2 = 0 \text{ and not in } specialsubframe \text{ with configuration 1, 2, 6, or 7} \\ 2, 3 & \text{if } n_s \bmod 2 = 1 \text{ and not in } specialsubframe \text{ with configuration 1, 2, 6, or 7} \end{cases}$$

$$m' = 0, 1, 2$$

The sequence $\overline{w}_p$ (i) can be given by following table 5.

TABLE 5

The sequence $\overline{w}_p(i)$ for normal cyclic prefix.

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The above explained RB alternating can be applied to DM-RS. But, the explanation below shall be focused on extension of CSI-RS for massive MIMO system.

CSI-RS in the LTE system is designed for the following purposes:
1. Feedback by estimating CSI (e.g. PMI, CQI, RI) by the UE from NZP CSI-RS resources
2. Reduce interference from physical channel by setting the resource of NZP CSI-RS of the interfering Node (e.g. transmission point, cell, etc) as ZP CSI-RS to the UE suffering the interference.
3. Estimating by the UE the amount of interference from IM (interference measurement) resource consisting of ZP CSI-RS resource for CQI calculation In addition to the above purposes, CSI-RS can be used for defining RSRP(RS received power)/RSRQ (RS received quality) to be used for cell selection/reselection or handover.

Conventional CSI-RS is mapped to one RE per every RB in the entire system bandwidth. When two or more CSI-RS ports are simultaneously transmitted, two ports are paired and mapped to adjacent OFDM symbols. These two ports are Code Divisional Multiplexed (CDMed). The above ports 15 and 16, 17 and 18, 19 and 20 and 21 and 22 are these examples.

Figure 23:
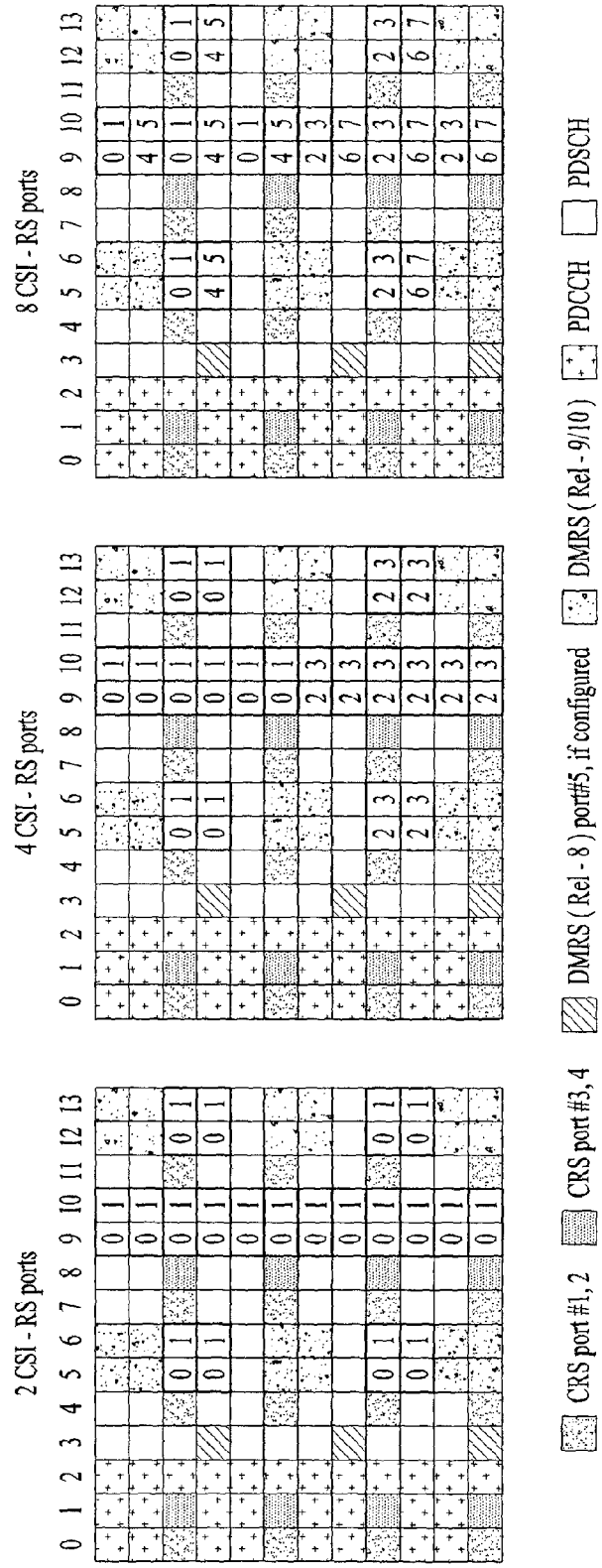
FIG. 23 shows 2 Tx, 4 Tx, 8 Tx CSI-RS pattern for normal CP structure.

FIG. 23 shows 2 Tx, 4 Tx, 8 Tx CSI-RS pattern for normal CP structure.

In FIG. 23, 0, 1 . . . , 7 corresponds to ports 15, 16, . . . , 22. And, antenna ports adjacent to each other in the time axis are Code Divisional Multiplexed.

As explained above, CSI-RS pattern is determined based on CSI-RS configuration number. CSI-RS is transmitted one per every 5~80 subframes based on the subframe configuration. That is, period and offset are determined based on CSI-RS subframe configuration number.

Based on this, one embodiment of the present invention proposes defining new RS resources by dividing the frequency bands by $M_f$ RBs contrary to the conventional technology where CSI-RS is transmitted every RB. Here, the RE position for CSI-RS is not limited to a specific pattern within the subframe where CSI-RS is transmitted.

The present embodiment is characterized in that the density of CSI-RS in the frequency domain is lower than the conventional art. Specifically, every CSI-RS ports transmit CSI-RS in the prior art, but the present embodiment uses different RBs for different CSI-RS ports. As shown in FIG. 12, CSI-RSs for antenna ports 15 and 16 are transmitted at RB 1 and RB 3 while CSI-RSs for antenna ports 17 and 18 are transmitted at RB 2 and RB 4. It is different from the prior art where CSI-RSs for antenna ports 15, 16, 17 and 18 are transmitted at every RB.

It should be noted that $M_f$ shall be more than 1 to reduce the RS overhead in the frequency domain.

Figure 24:
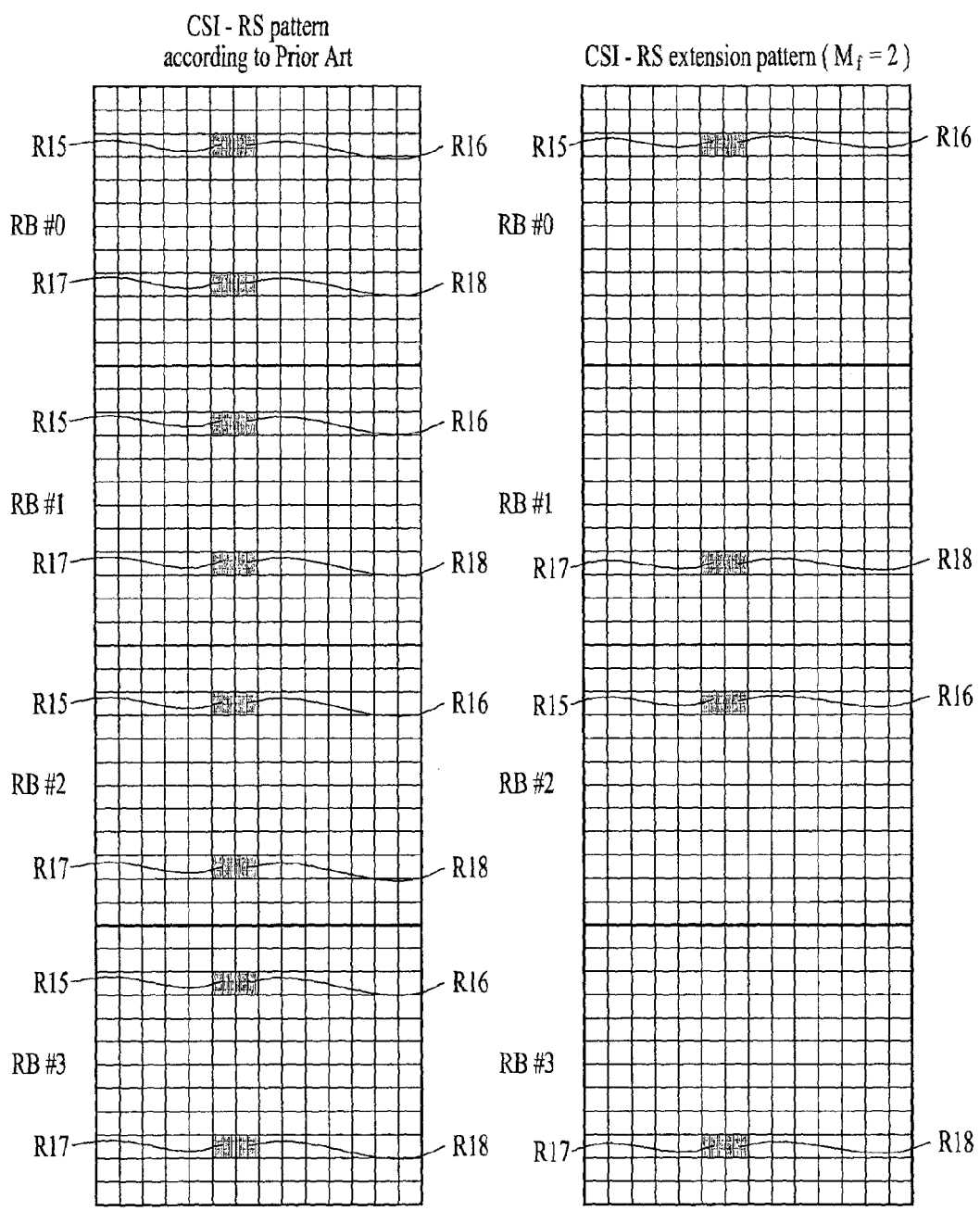
FIG. 24 shows the CSI-RS patterns of one embodiment of the present invention and the prior art where $M_f$ is 2 and the number of antenna is 4.
Figure 25:
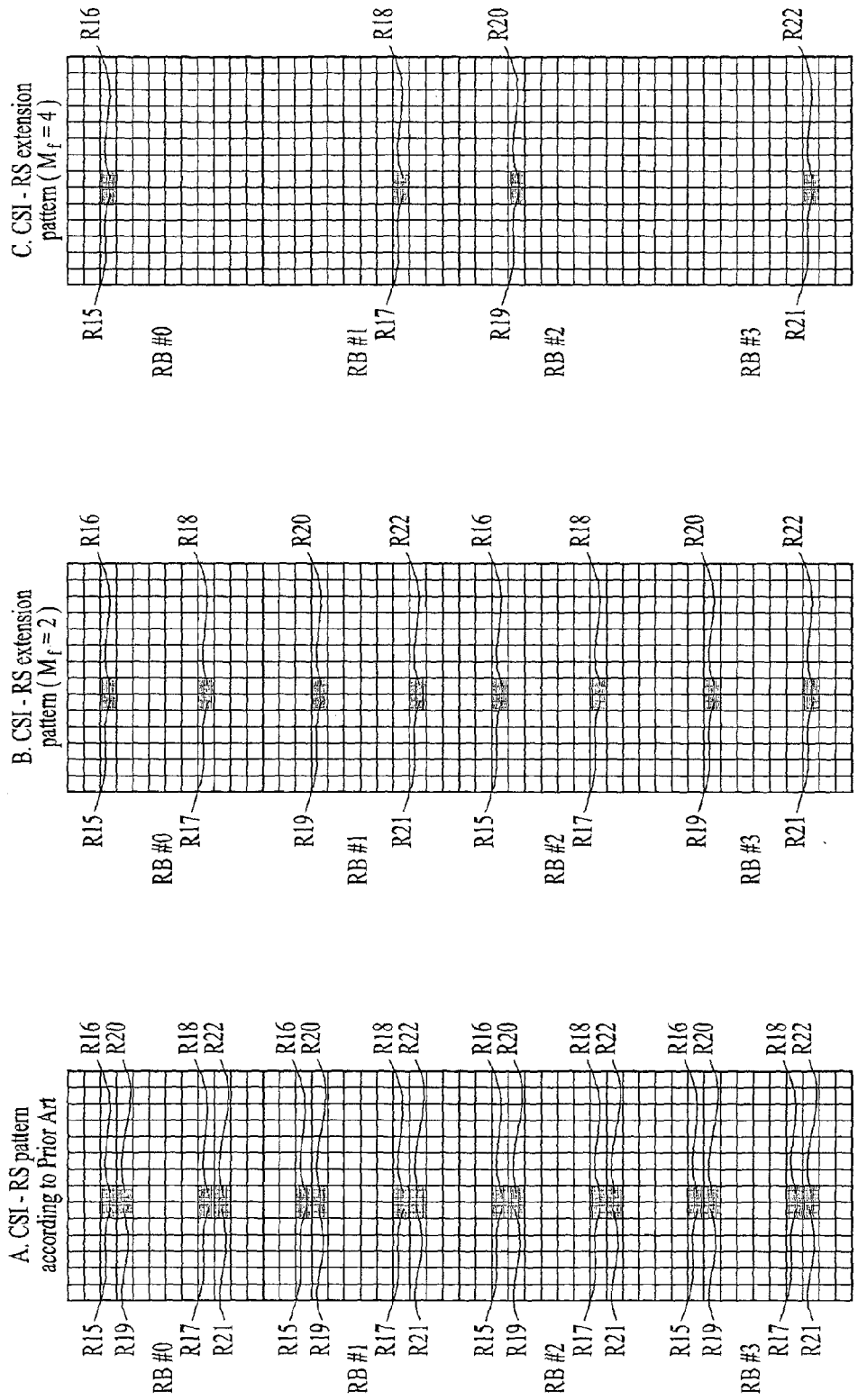
FIG. 25 shows the CSI-RS patterns of one embodiment of the present invention and the prior art where $M_f$ is 2 or 4 and the number of antenna is 8.
Figure 26:
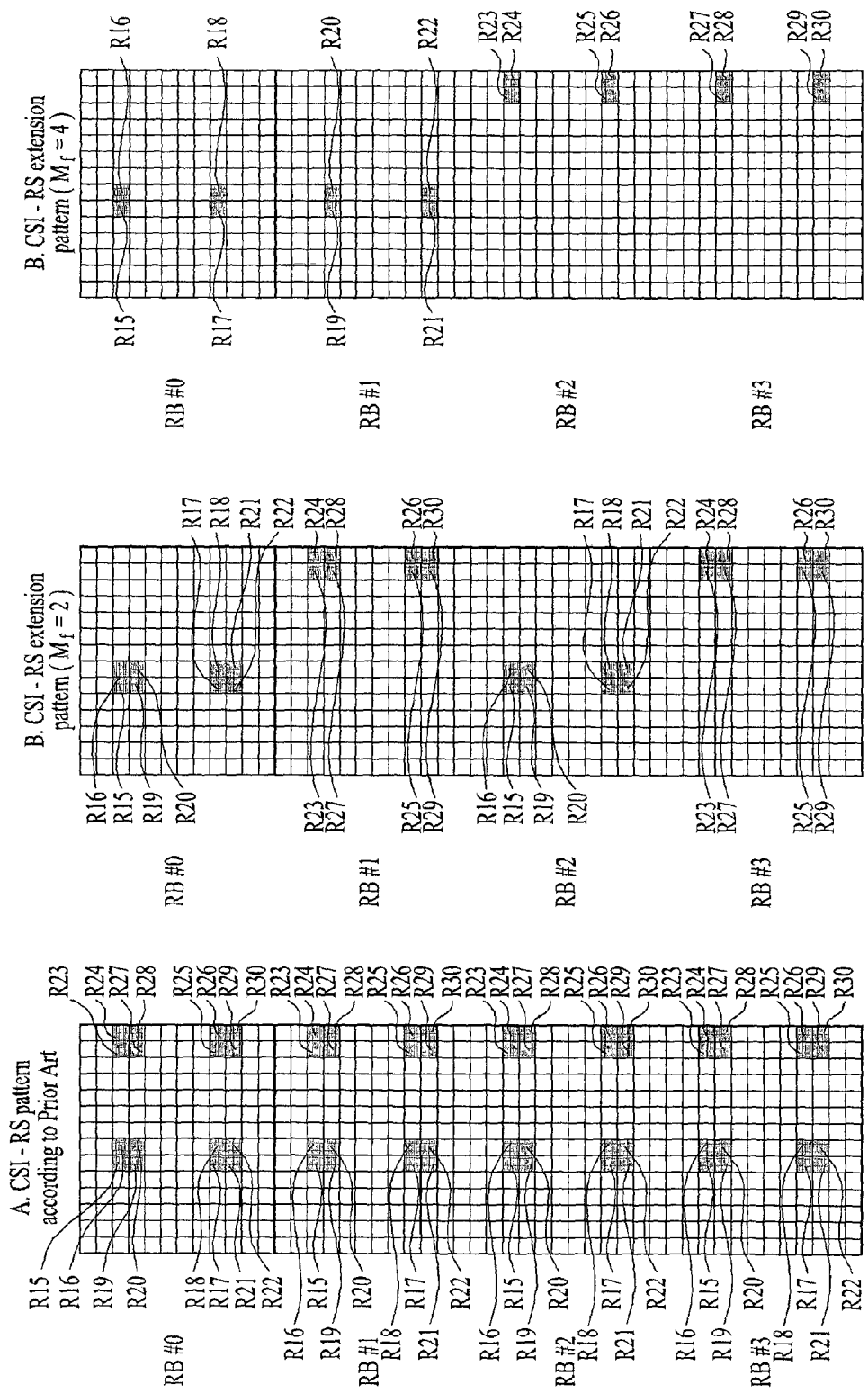
FIG. 26 shows the CSI-RS patterns of one embodiment of the present invention and the prior art where $M_f$ is 2 or 4 and the number of antenna is 16.

FIG. 24 shows the CSI-RS patterns of one embodiment of the present invention and the prior art where $M_f$ is 2 and the number of antenna is 4. FIG. 25 shows the CSI-RS patterns of one embodiment of the present invention and the prior art where $M_f$ is 2 or 4 and the number of antenna is 8. FIG. 26 shows the CSI-RS patterns of one embodiment of the present invention and the prior art where $M_f$ is 2 or 4 and the number of antenna is 16.

As can be seen from these figures, the present invention can efficiently reduce the RS overhead caused by the increase of the transmission antennas.

Meanwhile, it is expected that LTE-A system, which is the standard of a next generation mobile communication system, will support CoMP (coordinated multi point) transmission scheme unsupported by the previous standard in order to enhance a data transmission rate. In this case, the CoMP transmission scheme means a transmission scheme for enabling at least two base stations or cells to coordinately communicate with a user equipment to enhance communication performance between a base station (cell or sector) and a user equipment located in a radio shadow area.

The CoMP transmission scheme may be categorized into CoMP-JP (CoMP-Joint Processing) of a coordinated MIMO type through data sharing and CoMP-CS/CB (CoMP Coordinated Scheduling/Coordinated Beamforming).

In CoMP-JP for a case of a downlink, a user equipment can receive data from base stations, each of which performs the CoMP transmission, simultaneously and instantly and is then able to enhance reception performance by combining the signals received from the base stations together [Joint Transmission (JT)]. And, it is able to consider a method for one of the base stations, each of which performs the CoMP transmission, to transmit data to the user equipment at a specific timing point [Dynamic Pont Selection (DPS)].

On the other hand, in CoMP-CS/CB (CoMP Coordinated Scheduling/Coordinated Beamforming), a user equipment can instantly receive data from a single base station, and more particularly, from a serving base station by beamforming.

In CoMP-JP (CoMP-Joint Processing) for a case of an uplink, each base station can receive a PUSCH signal from a user equipment simultaneously [Joint Reception (JR)]. On the other hand, in CoMP-CS/CB (CoMP Coordinated Scheduling/Coordinated Beamforming), a single base station receives PUSCH only. In doing so, determination for using the CoMP-CS/CB (CoMP Coordinated Scheduling/ Coordinated Beamforming) is made by coordinated cells (or base stations).

CS/CB scheme may include SSPS scheme.

Semi-static point selection (SSPS): Transmission to a specific UE from one point at a time. The transmitting point may only change in a semi-static manner On the other hand, Dynamic point selection (DPS)/muting scheme can be employed. In this scheme, data transmission is from one point (within the CoMP cooperating set) in a time-frequency resource. The transmitting/muting point may change from one subframe to another including varying over the RB pairs within a subframe. Data is available simultaneously at multiple points. This may include Dynamic cell selection (DCS).

Further, the following terminologies are defined for CoMP operation.

CoMP Cooperating Set

Set of (geographically separated) points directly and/or indirectly participating in data transmission to a UE in a time-frequency resource.

Direct participation: point(s) actually transmitting data

Indirect participation: candidate point(s) for data transmission that do not transmit data but contribute in making decisions on the user scheduling/beamforming CoMP Transmission Point(s): Point or Set of Points Transmitting Data to a UE CoMP transmission point(s) is (are) a subset of the CoMP cooperating set For JT, CoMP transmission points may include multiple points in the CoMP cooperating set For CS/CB, DPS, a single point in the CoMP cooperating set is the CoMP transmission point CoMP Measurement Set:

set of points about which channel state information related to their link to the UE is measured and/or reported.

In LTE-A system (rel-10), the concept of Quasi Co-Location (QCL) is introduced for supporting the above mentioned CoMP transmission. In one embodiment of the present invention, the number of RB groups (M) is determined based on the number of co-located RS ports.

Definition of antenna ports quasi co-location (QCL) is defined as following:

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

Based on this, antenna ports quasi co-location for PDSCH is like the following:

A UE configured in transmission mode 1-10 may assume the antenna ports 0-3 (CRS ports) of a serving cell are quasi co-located with respect to delay spread, Doppler spread, Doppler shift, average gain, and average delay.

A UE configured in transmission mode 8-10 may assume the antenna ports 7-14 (DM-RS ports) of a serving cell are quasi co-located for a given subframe with respect to delay spread, Doppler spread, Doppler shift, average gain, and average delay.

A UE configured in transmission mode 1-9 may assume the antenna ports 0-3, 5, 7-22 of a serving cell are quasi co-located with respect to Doppler shift, Doppler spread, average delay, and delay spread.

A UE configured in transmission mode 10 is configured with one of two quasi co-location types by higher layer signaling to decode PDSCH according to transmission scheme associated with antenna ports 7-14 (DM-RS ports):

Type A: The UE may assume the antenna ports 0-3, 7-22 of a serving cell are quasi co-located with respect to delay spread, Doppler spread, Doppler shift, and average delay Type B: The UE may assume the antenna ports 15-22 corresponding to the CSI RS resource configuration identified by 'CSI-RS resource configuration identity for PDSCH RE mapping' and the antenna ports 7-14 associated with the PDSCH are quasi co-located with respect to Doppler shift, Doppler spread, average delay, and delay spread.

PDSCH resource mapping parameters are as follows:

A UE configured in transmission mode 10 for a given serving cell can be configured with up to 4 parameter sets by higher layer signaling to decode PDSCH according to a detected PDCCH/EPDCCH with DCI format 2D intended for the UE and the given serving cell. The UE shall use the parameter set according to the value of the 'PDSCH RE Mapping and Quasi-Co-Location indicator' field (mapping defined in Table 6) in the detected PDCCH/EPDCCH with DCI format 2D for determining the PDSCH RE mapping and PDSCH antenna port quasi co-location. For PDSCH without a corresponding PDCCH, the UE shall use the parameter set indicated in the PDCCH/EPDCCH with DCI format 2D corresponding to the associated SPS activation for determining the PDSCH RE mapping and PDSCH antenna port quasi co-location.

TABLE 6

PDSCH RE Mapping and Quasi-Co-Location Indicator field in DCI format 2D

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining PDSCH RE mapping and PDSCH antenna port quasi co-location are configured via higher layer signaling for each parameter set:
'Number of CRS antenna ports for PDSCH RE mapping'.
'CRS frequency shift for PDSCH RE mapping'.
'MBSFN subframe configuration for PDSCH RE mapping'.
'Zero-power CSI-RS resource configuration for PDSCH RE mapping'.
'PDSCH starting position for PDSCH RE mapping'.
'CSI-RS resource configuration identity for PDSCH RE mapping'.

A UE configured in transmission mode 10 for a given serving cell can be configured with a parameter set selected from the four parameter sets in Table 6 by higher layer signaling for determining the PDSCH RE mapping and PDSCH antenna port quasi co-location to decode PDSCH according to a detected PDCCH/EPDCCH with DCI format 1A intended for the UE and the given serving cell. The UE shall use the configured parameter set, determining the PDSCH RE mapping and PDSCH antenna port quasi co-location for decoding PDSCH corresponding to detected PDCCH/EPDCCH with DCI format 1A and PDSCH without a corresponding PDCCH associated with SPS activation indicated in PDCCH/EPDCCH with DCI format 1A.

As stated above, the base station in transmission mode 10 may set QCL type by upper layer signaling among QCL type A and QCL type B. QCL type A means CRS, DM-RS (UE-specific RS) and CSI-RS (except average gain point of view) ports are QCLed, and means physical channels and signals are transmitted by the same point/node. In QCL type B, upto 4 CoMP transmission modes including DPS, dynamic muting, JT, etc is available for a UE by upper layer signaling, and DCI format 2D may indicate which of the modes is to be used for receiving PDSCH (and/or E-PDCCH). See. CSI-RS resource configuration identity for PDSCH RE mapping' field in above Table. This transmission mode includes QCL condition between DM-RS and CSI-RS.

Examples of DPS using QCL type B are as follows:
Node 1 having $N_1$ antenna ports transmits CSI-RS pattern (resource) #1
  Parameter set 1 may include PDSCH RE Mapping and QCL Indicator field
Node 2 having $N_2$ antenna ports transmits CSI-RS pattern (resource) #2
  Parameter set 2 may include PDSCH RE Mapping and QCL Indicator field The base station may set the parameter set 1 and the parameter set 2 by upper layer signaling to a UE in the common coverage area of node 1 and node 2.

The base station performs dynamic point selection using DCI format 2 by setting parameter set 1 when transmitting data (PDSCH) via node 1 and setting parameter set 2 when transmitting data (PDSCH) via node 2

The UE suppose by using DCI format 2D that DM-RS and CSI-RS pattern #1 are QCLed when parameter set 1 is set, and DM-RS and CSI-RS pattern #2 are QCLed when parameter set 2 is set DM-RS for E-PDCCH is defined for ports 107-110 with similar pattern as UE-specific RS for ports 7-10. The QCL condition for E-PDCCH DM-RS is also defined as types A and B. QCL type A is a case when CRS and E-PDCCH DM-RS are QCLed, and type B is a case when CSI-RS port identified by DC1 format 2D and E-PDCCH DM-RS are QCLed.

Antenna ports quasi co-location for EPDCCH is as follows:

For a given serving cell, if the UE is configured via higher layer signalling to receive PDSCH data transmissions according to transmission modes 1-9, and if the UE is configured to monitor EPDCCH, the UE may assume the antenna ports 0-3, 107-110 of the serving cell are quasi co-located with respect to Doppler shift, Doppler spread, average delay, and delay spread.

For a given serving cell, if the UE is configured via higher layer signalling to receive PDSCH data transmissions according to transmission mode 10, and if the UE is configured to monitor EPDCCH, for each EPDCCH-PRB-set, if the UE is configured by higher layers to decode PDSCH according to quasi co-location Type-A, the UE may assume the antenna ports 0-3, 107-110 of the serving cell are quasi co-located with respect to Doppler shift, Doppler spread, average delay, and delay spread. And, if the UE is configured by higher layers to decode PDSCH according to quasi co-location Type-B, the UE may assume antenna ports 15-22 corresponding to the 'CSI-RS resource configuration identity for PDSCH RE mapping' and antenna ports 107-110 are quasi co-located with respect to Doppler shift, Doppler spread, average delay, and delay spread. The UE may assume the antenna ports 0-3 corresponding to the CSI-RS resource configuration identified by 'CSI-RS resource configuration identity for PDSCH RE mapping' and antenna ports 15-22 corresponding to the CSI-RS resource configuration identified by 'CSI-RS resource configuration identity for PDSCH RE mapping' are quasi co-located with respect to Doppler shift, and Doppler spread.

As stated above, in one embodiment of the present invention, $M_f$ RBs are grouped into one group, one or more antenna ports are grouped into one antenna group, and CSI-RS of one antenna group is only transmitted via one RB among $M_f$ RBs.

$M_f$ can be predetermined by the system (e.g. $M_f$=2). Or, it can be set based on configuration by RRC. SIB, MIB or other RRC message can be used for this purpose. In one embodiment, $M_f$ can be adaptively determined based on the number of co-located RS or patterns. That is, $M_f$ can be adaptively determined based on the number of co-located RS or patterns transmitted by the same transmission point. In this case, by increasing $M_f$ when the number of RSs or patterns increase, RS overhead can be efficiently managed.

$M_f$ can have a value within $$1 \le M_f \le \left\lfloor \frac{N_{BW}}{N_{sc}^{RB}} \right\rfloor,$$

where $N_{BW}$ represents coherent bandwidth and $N_{sc}^{RB}$ represent the number of subcarrier within one RB. Here, when $N_{BW}$ is large, $M_f$ can be large too. But, $M_f$ can be determined regardless of $N_{BW}$.

When the total number of antenna ports is $N_p$, the number of antenna groups can be $$\left\lfloor \frac{N_p}{M_f} \right\rfloor \text{ or } \left\lfloor \frac{N_p}{M_f} \right\rfloor + 1.$$

One embodiment of the present invention proposes mapping the CSI-RSs of different antenna groups to different RBs. That is, CSI_RSs of the same antenna groups are mapped to the same RB.

In one embodiment of the present invention, the RB position of CSI-RS of antenna port p can be determined by following equation.

$$r = \mathrm{mod}(p-15, M_f) + n M_f + o \quad \text{[Equation 15]}$$

Here, 'r' represents the RB position of antenna port 'p'. 'o' represent offset and it has value within $0 \le o \le M_f - 1$. The offset value can have one value for each antenna port 'p'. 'n' represents a group index and it may corresponds to the total number of RBs divided by $M_f$.

CSI-RS position within a specific RB can be the same as the LTE system or different from the LTE system.

By the equation 15, when n=0, $M_f$=2, p={15,16,17,18}, the CSI-RSs of p={15,17} are transmitted at RB #0 and the CSI-RSs of p={16,18} are transmitted at RB #1.

In another embodiment of the present invention, the RB position of CSI-RS of antenna port p can be determined by following equation.

$$r = \left\lfloor \frac{p-15}{M_f} \right\rfloor + n M_f + o \quad \text{[Equation 16]}$$

Here, 'r' represents the RB position of antenna port 'p'. 'o' represent offset and it has value within $0 \le o \le M_f - 1$ The offset value can have one value for each antenna port 'p'. 'n' represents a group index and it may corresponds to the total number of RBs divided by $M_f$.

By the equation 16, when n=0, $M_f$=2, p={15,16,17,18}, the CSI-RSs of p={15,16} and p={17,18} are transmitted at RB #0 and RB #1, respectively.

In the above equations, the offset value 'o' can be determined by a function of one or more of the following parameters or signaled by the network.

Parameters for the offset: physical cell ID ($N_{ID}^{cell}$) CSI-RS ID ($N_{ID}^{CSI}$), subframe number or sequence, and port number.

When the offset value is a function of antenna port, the offset value can be set as 1 when the port number is even, and −1 when the port number if odd.

The application of the present embodiment (that is, whether RB grouping is applied or not) can be signaled by the upper layer signaling or physical message.

Or, it can be implicitly determined based on the number of co-located RS ports or patterns. For this purpose, the following embodiments are proposed.

The base station may explicitly or implicitly indicate the co-location status between RS patterns. For this, QCL condition indication with multiple NZP CSI-RS resources or multiple CSI processes can be used. Or, explicit RRC signaling of co-located NZP CSI-RS resources can be used. For this, the UE may assume that multiple NZP CSI-RS resources within one CSI process are co-located. Based on this, the base station may set co-located NZP CSI-RS resources as one CSI process.

In contrary, the UE may determine by itself whether the RS patterns are co-located. The UE may determine whether the RSs are co-located based on the reception timing offset of the RS patterns. When the reception timing offset is within a threshold value, the UE may determine that the RSs are co-located.

Or, the UE may determine this based on the characteristic of the channel (e.g. Doppler spread, Delay spread, Delay profile, etc.). When the characteristics of the RSs are similar, the UE may determine that the RSs are co-located.

When the network wants to signal (a) $M_f$ and (b) whether RB grouping is applied, it may signal them with one message. Following table is an example for this signaling.

TABLE 7

| Message = 00 | $M_f$ = 1 (Legacy CSI-RS pattern) |
| Message = 01 | $M_f$ = 2 |
| Message = 10 | $M_f$ = 3 |
| Message = 11 | $M_f$ = 4 |

The above signaling can be combined with CSI-RS configuration.

TABLE 8

| PhysicalConfigDedicated information element |
|---|
| -- ASN1START |
| PhysicalConfigDedicated ::=    SEQUENCE { |
|     pdsch-ConfigDedicated          PDSCH-ConfigDedicated |
| OPTIONAL,                      -- Need ON |
|     pucch-ConfigDedicated          PUCCH-ConfigDedicated |
| OPTIONAL,                      -- Need ON |
|     pusch-ConfigDedicated          PUSCH-ConfigDedicated |
| OPTIONAL,                      -- Need ON |
|     uplinkPowerControlDedicated    UplinkPowerControlDedicated |

TABLE 8-continued

| PhysicalConfigDedicated information element |
|---|

```
OPTIONAL,                        -- Need ON
    tpc-PDCCH-ConfigPUCCH                        TPC-PDCCH-Config
OPTIONAL,                        -- Need ON
    tpc-PDCCH-ConfigPUSCH                        TPC-PDCCH-Config
OPTIONAL,                        -- Need ON
    cqi-ReportConfig                             CQI-ReportConfig
OPTIONAL,                        -- Cond CQI-r8
soundingRS-UL-ConfigDedicated                    SoundingRS-UL-ConfigDedicated
OPTIONAL                         -- Need ON
    (Ommitted)
    [[ antennaInfoDedConfigToReleaseList-r11                 AntennaInfoDedConfigToReleaseList-
r11 OPTIONAL,-- Need ON
        antennaInfoDedConfigToAddModList-r11                 AntennaInfoDedConfigToAddModList-
r11 OPTIONAL,-- Need ON
        cqi-ReportConfig-v11x0                   CQI-ReportConfig-v11x0     OPTIONAL,
-- Need ON
        cqi-ReportPeriodicExtToReleaseList-r11               CQI-ReportPeriodicExtToReleaseList-
r11 OPTIONAL,-- Need ON
        cqi-ReportPeriodicExtToAddModList-r11                CQI-ReportPeriodicExtToAddModList-
r11 OPTIONAL,-- Need ON
        csi-IM-ConfigToReleaseList-r11           CSI-IM-ConfigToReleaseList-r11
OPTIONAL,                        -- Need ON
        csi-IM-ConfigToAddModList-r11            CSI-IM-ConfigToAddModList-r11
OPTIONAL,                        -- Need ON
        csi-ProcessToReleaseList-r11             CSI-ProcessToReleaseList-r11 OPTIONAL,
-- Need ON
        csi-ProcessToAddModList-r11              CSI-ProcessToAddModList-r11
OPTIONAL,                        -- Need ON
        csi-RS-ConfigZPToReleaseList-r11CSI-RS-ConfigZPToReleaseList-r11
OPTIONAL,                        -- Need ON
        csi-RS-ConfigZPToAddModList-r11                      CSI-RS-ConfigZPToAddModList-r11
OPTIONAL,                        -- Need ON
        csi-RS-ConfigNZPToReleaseList-r11        CSI-RS-ConfigNZPToReleaseList-r11
OPTIONAL,                        -- Need ON
        csi-RS-ConfigNZPToAddModList-r11         CSI-RS-ConfigNZPToAddModList-r11
OPTIONAL,                        -- Need ON
        epdcch-Config-r11                        EPDCCH-Config-r11          OPTIONAL,
-- Need ON
        pdsch-ConfigDedicated-v11xy              PDSCH-ConfigDedicated-v11xy
OPTIONAL,                        -- Need ON
        pucch-ConfigDedicated-v11x0              PUCCH-ConfigDedicated-v11x0
OPTIONAL,                        -- Need ON
        pusch-ConfigDedicated-v11xy              PUSCH-ConfigDedicated-v11xy
OPTIONAL,                        -- Need ON
        uplinkPowerControlDedicated-v11xy        UplinkPowerControlDedicated-v11xy
    OPTIONAL                     -- Need ON
    ]]
}
PhysicalConfigDedicatedSCell-r10 ::=             SEQUENCE {
    (Ommitted: Contents is simillat to PhysicalConfigDedicated IE)
}
AntennaInfoDedConfigToAddModList-r11 ::=    SEQUENCE (SIZE (1..maxAID-r11)) OF
AntennaInfoDedConfig-r11
AntennaInfoDedConfigToReleaseList-r11 ::=                SEQUENCE (SIZE (1..maxAID-r11)) OF
AntennaInfoDedConfigId-r11
CSI-IM-ConfigToAddModList-r11 ::=                SEQUENCE (SIZE (1..maxCSI-IM-r11)) OF
CSI-IM-Config-r11
CSI-IM-ConfigToReleaseList-r11 ::=               SEQUENCE (SIZE (1..maxCSI-IM-r11)) OF
CSI-IM-Identity-r11
CSI-ProcessToAddModList-r11 ::=                  SEQUENCE (SIZE (1..maxCSI-Proc-r11)) OF CSI-
Process-r11
CSI-ProcessToReleaseList-r11 ::=                 SEQUENCE (SIZE (1..maxCSI-Proc-r11)) OF CSI-
ProcessIdentity-r11
CSI-RS-ConfigNZPToAddModList-r11 ::=SEQUENCE (SIZE (1..maxCSI-RS-NZP-r11))
OF CSI-RS-ConfigNZP-r11
CSI-RS-ConfigNZPToReleaseList-r11 ::=            SEQUENCE (SIZE (1..maxCSI-RS-NZP-r11))
OF CSI-RS-IdentityNZP-r11
CSI-RS-ConfigZPToAddModList-r11 ::=              SEQUENCE (SIZE (1..maxCSI-RS-ZP-r11))
OF CSI-RS-ConfigZP-r11
CSI-RS-ConfigZPToReleaseList-r11 ::=             SEQUENCE (SIZE (1..maxCSI-RS-ZP-r11))
OF CSI-RS-IdentityZP-r11
CQI-ReportPeriodicExtToAddModList-r11 ::=                    SEQUENCE (SIZE (1..maxCQI-Ext-
r11)) OF CQI-ReportPeriodicExt-r11
CQI-ReportPeriodicExtToReleaseList-r11 ::=                   SEQUENCE (SIZE (1..maxCQI-Ext-r11))
OF CQI-ReportPeriodicExtId-r11
-- ASN1STOP
```

TABLE 9

CSI-Process information elements [4]

```
-- ASN1START
CSI-Process-r11 ::=              SEQUENCE {
    csi-ProcessIdentity-r11          CSI-ProcessIdentity-r11,
    csi-RS-IdentityNZP-r11              CSI-RS-IdentityNZP-r11,
    csi-IM-Identity-r11              CSI-IM-Identity-r11,
    p-C-AndAntennaInfoDedList-r11    SEQUENCE (SIZE (1..2))OF P-C-
AndAntennaInfoDed-r11,
    cqi-ReportBothPS-r11             CQI-ReportBothPS-r11           OPTIONAL,      -- Need
OR
    cqi-ReportPeriodicId-r11         INTEGER (0..maxCQI-Ext-r11)         OPTIONAL,
    -- Need OR
    cqi-ReportAperiodicPS-r11 CQI-ReportAperiodicPS-r11                  OPTIONAL,      --
Need OR
    ...
}
P-C-r11 ::=                      INTEGER (-8..15)
P-C-AndAntennaInfoDed-r11::=         SEQUENCE {
    p-C-r11                          P-C-r11,
    antennaInfoDedConfigId-r11          AntennaInfoDedConfigId-r11
}
-- ASN1STOP
```

TABLE 10

CSI-RS-ConfigNZP information elements

```
-- ASN1START
CSI-RS-ConfigNZP-r11 ::=    SEQUENCE {
    csi-RS-IdentityNZP-r11              CSI-RS-IdentityNZP-r11,
    antennaPortsCount-r11       ENUMERATED {an1, an2, an4, an8},
    resourceConfig-r11          INTEGER (0..31),
    subframeConfig-r11                  INTEGER(0..154),
    scramblingIdentity-r11              INTEGER(0..503),
    qcl-CSR-Info-r11                    SEQUENCE {
        qcl-ScramblingIdentity-r11      INTEGER (0..503),
        crs-PortsCourt-r11                  ENUMERATED {n1, n2, n4, spare1},
        mbsfn-SubframeConrig-r11        MBSFN-SubframeConfig
    OPTIONAL -- Need OR
    }                           OPTIONAL,   -- Need OR
    ...
}
-- ASN1STOP
```

As can be seen from the above Tables 8-10, multiple of NZP CSI-RS, ZP CSI-RS, CSI-IM resource, CSI process can be set, and multiple CSI processes can be set for a rel-11 UE. Generally, one CS process corresponds to one CoMP transmission mode (e.g. point A transmission, point B transmission, JT of point A & B), so various transmission modes can be supported by the multiple CSI processes.

In addition to the above configuration, the $M_f$ value and/or whether RB grouping is applied can be signaled together.

Figure 27:
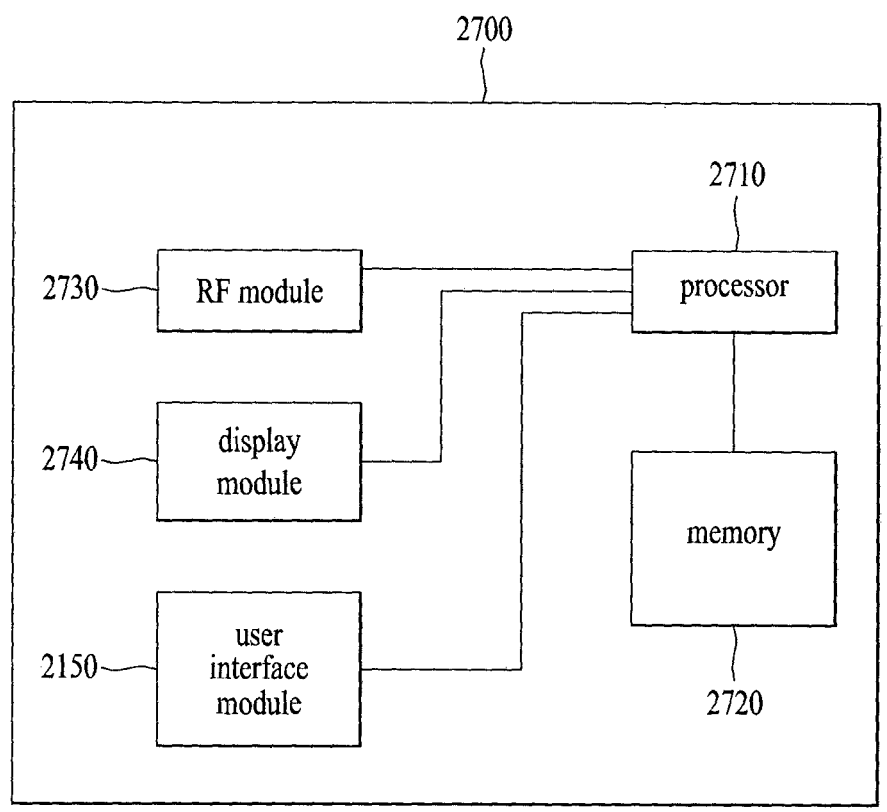
FIG. 27 is a block diagram for one example of a communication device according to one embodiment of the present invention.

FIG. 27 is a block diagram for one example of a communication device according to one embodiment of the present invention.

Referring to FIG. 27, a communication device 2100 includes a processor 2110, a memory 2120, an RF module 2130, a display module 2140 and a user interface module 2150.

The communication device 2100 is illustrated for clarity and convenience of the description and some modules can be omitted. Moreover, the communication device 2100 is able to further include at least one necessary module. And, some modules of the communication device 2100 can be further divided into sub-modules. The processor 2110 is configured to perform operations according to the embodiment of the present invention exemplarily described with reference to the accompanying drawings. In particular, the detailed operations of the processor 2110 can refer to the contents described with reference to FIGS. 1 to 26.

The memory 2120 is connected to the processor 2110 and stores operating systems, applications, program codes, data and the like. The RF module 2130 is connected to the processor 2110 and performs a function of converting a baseband signal to a radio signal or converting a radio signal to a baseband signal. For this, the RF module 2130 performs analog conversion, amplification, filtering and frequency uplink transform or inverse processes thereof. The display module 2140 is connected to the processor 2110 and displays various kinds of informations. The display module 2140 can include such a well-known element as LCD (Liquid Crystal Display), LED (Light Emitting Diode), OLED (Organic Light Emitting Diode) and the like, by which the present invention is non-limited. The user interface module 2150 is connected to the processor 2110 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although methods of transmitting reference signals for a massive MIMO system and apparatuses therefor are described mainly with reference to examples applied to 3GPP LTE system, as mentioned in the foregoing description, the present invention is applicable to various kinds of wireless communication systems as well as the 3GPP LTE system.

The invention claimed is:

1. A method for a base station having multiple antennas to transmit reference signals to user equipments (UEs), the method comprising:

grouping 'M' resource blocks (RBs) into a resource block group, wherein 'M' is greater than 1, wherein the number of multiple antennas is greater than 8;

grouping antenna ports into 'M' antenna groups, wherein each of the antenna ports corresponds to each of the multiple antennas;

mapping reference signals of each of one or more antenna ports within one antenna group into only one RB per resource block group; and transmitting the reference signals to the UEs, wherein a reference signal of an antenna port 'p' among the antenna ports are mapped to resource block 'r' based on an equation of:

$r = P \bmod M + nM + o,$ wherein 'P' corresponds to a sequence of the antenna port 'p' among the antenna ports transmitting the reference signals, 'n' corresponds to the number of resource block groups, and 'o' corresponds to an offset value.

2. The method of claim 1, wherein the reference signals of different antenna groups are mapped to different RBs of a same resource block group.

3. The method of claim 1, wherein 'M' is based on system information.

4. The method of claim 1, wherein 'M' is determined based on a number of co-located Reference Signal ports.

5. The method of claim 1, wherein the reference signals are channel state information-reference signal (CSI-RS) reference signals.

6. The method of claim 1, wherein the offset value is determined based on a physical cell identification (ID), a channel state information-reference signal (CSI-RS) ID, a subframe number or an antenna port index.

7. The method of claim 1, wherein the base station transmits signals based on a 3D beam forming scheme using the multiple antennas.

8. A method for a user equipment (UE) to receive reference signals from one or more base stations, the method comprising:

receiving the reference signals from the base stations, wherein 'M' resource blocks (RBs) are grouped into a resource block group, wherein 'M' is greater than 1, wherein the reference signals are transmitted by 8 or more antennas, wherein antenna ports are grouped into 'M' antenna groups, wherein each of the antenna ports corresponds to each of the multiple antennas, wherein reference signals of each of one or more antenna ports within one antenna group are received via only one RB per resource block group; and estimating channel based on the received reference signals, wherein a reference signal of an antenna port 'p' among the antenna ports are mapped to resource block 'r' based on an equation of:

$r = P \bmod M + nM + o,$ wherein 'P' corresponds to a sequence of the antenna port 'p' among the antenna ports transmitting the reference signals, 'n' corresponds to the number of resource block groups, and 'o' corresponds to an offset value.

9. The method of claim 8, wherein the reference signals of different antenna groups are mapped to different RBs of a same resource block group.

10. The method of claim 8, wherein 'M' is determined based on a number of co-located Reference Signal ports.

11. The method of claim 8, wherein the reference signals are channel state information-reference signal (CSI-RS) reference signals.

12. A base station device comprising:
multiple antennas to transmit reference signals to user equipments (UEs), wherein the number of multiple antennas is greater than 8; and
a processor connected to the multiple antennas, that:
groups 'M' resource blocks (RBs) into a resource block group, wherein 'M' is greater than 1,
groups antenna ports into 'M' antenna groups, wherein each of the antenna ports corresponds to each of the multiple antennas;
maps reference signals of each of one or more antenna ports within one antenna group into only one RB per resource block group,
wherein a reference signal of an antenna port 'p' among the antenna ports are mapped to resource block 'r' based on an equation of:

$$r = P \bmod M + nM + o,$$

wherein 'P' corresponds to a sequence of the antenna port 'p' among the antenna ports transmitting the reference signals, 'n' corresponds to the number of resource block groups, and 'o' corresponds to an offset value.

* * * * *